US010994366B2

(12) United States Patent
Ishino et al.

(10) Patent No.: US 10,994,366 B2
(45) Date of Patent: May 4, 2021

(54) REPAIR METHOD AND REPAIR MATERIAL

(71) Applicant: Murata Manufacturing Co., Ltd., Nagaokakyo (JP)

(72) Inventors: Satoshi Ishino, Nagaokakyo (JP); Yoshihiro Kawaguchi, Nagaokakyo (JP); Kosuke Nakano, Nagaokakyo (JP); Hidekiyo Takaoka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 315 days.

(21) Appl. No.: 16/120,522

(22) Filed: Sep. 4, 2018

(65) Prior Publication Data

US 2018/0369951 A1    Dec. 27, 2018

Related U.S. Application Data

(60) Division of application No. 15/183,025, filed on Jun. 15, 2016, which is a continuation of application No. PCT/JP2015/050108, filed on Jan. 6, 2015.

(30) Foreign Application Priority Data

Jan. 7, 2014   (JP) ................ 2014-000958
Jul. 30, 2014   (JP) ................ 2014-155277

(51) Int. Cl.
  *B23K 20/16*   (2006.01)
  *B22F 1/00*   (2006.01)
  (Continued)

(52) U.S. Cl.
  CPC .......... *B23K 20/026* (2013.01); *B22F 1/0003* (2013.01); *B22F 1/0059* (2013.01);
  (Continued)

(58) Field of Classification Search
  None
  See application file for complete search history.

(56) References Cited

U.S. PATENT DOCUMENTS 5,714,700 A  2/1998 Nishida et al.
6,333,494 B1 12/2001 Fischer et al.
(Continued)

FOREIGN PATENT DOCUMENTS

JP   S6012294 A   1/1985
JP   2002171055 A  6/2002
(Continued)

OTHER PUBLICATIONS

International Search Report issued for PCT/JP2015/050108, dated Apr. 14, 2015.
(Continued)

*Primary Examiner* — Devang R Patel
(74) *Attorney, Agent, or Firm* — Arent Fox LLP

(57) ABSTRACT

A repair method that includes covering a damaged part of a member to be repaired with a repair material, and heating the repair material to a predetermined temperature to form an alloy layer. At least the surface of the member to be repaired is a first metal such as Cu. The repair material includes a second metal such as Sn. By the heating, the surface of the member to be repaired is integrally joined with a layer of an intermetallic compound and an alloy having a melting point higher than a melting point of either of the first metal or the second metal.

12 Claims, 28 Drawing Sheets

(51) Int. Cl.

| | |
|---|---|
| *B22F 7/06* | (2006.01) |
| *B23K 20/02* | (2006.01) |
| *B23K 1/00* | (2006.01) |
| *B23K 3/06* | (2006.01) |
| *B23P 6/00* | (2006.01) |
| *B23K 20/227* | (2006.01) |
| *B23K 35/30* | (2006.01) |
| *B23K 35/00* | (2006.01) |
| *B23K 35/02* | (2006.01) |
| *C22C 1/04* | (2006.01) |
| *B23K 20/233* | (2006.01) |
| *B23K 101/10* | (2006.01) |
| *B23K 101/06* | (2006.01) |
| *B23K 101/18* | (2006.01) |
| *B23K 103/04* | (2006.01) |

(52) U.S. Cl.
CPC ............ *B22F 7/062* (2013.01); *B23K 1/0008* (2013.01); *B23K 3/0623* (2013.01); *B23K 20/16* (2013.01); *B23K 20/227* (2013.01); *B23K 20/233* (2013.01); *B23K 35/007* (2013.01); *B23K 35/0238* (2013.01); *B23K 35/302* (2013.01); *B23P 6/00* (2013.01); *C22C 1/0483* (2013.01); *C22C 1/0491* (2013.01); *B23K 2101/06* (2018.08); *B23K 2101/10* (2018.08); *B23K 2101/18* (2018.08); *B23K 2103/05* (2018.08)

(56) References Cited

U.S. PATENT DOCUMENTS

| | | | |
|---|---|---|---|
| 6,772,936 | B2 | 8/2004 | Polvi |
| 8,598,464 | B2 | 12/2013 | Sakatani et al. |
| 8,701,973 | B2 | 4/2014 | Kuramoto et al. |
| 9,105,987 | B2 | 8/2015 | Nakano et al. |
| 9,221,131 | B2 | 12/2015 | Ingham et al. |
| 2001/0002982 | A1 | 6/2001 | Sarkhel et al. |
| 2003/0038165 | A1 | 2/2003 | Polvi |
| 2005/0218525 | A1 | 10/2005 | Takahashi et al. |
| 2008/0083819 | A1* | 4/2008 | Hsu ............... B23K 3/0623 228/119 |
| 2008/0292492 | A1 | 11/2008 | Ingham et al. |
| 2011/0120769 | A1 | 5/2011 | Sakatani et al. |
| 2011/0297433 | A1 | 12/2011 | Kuramoto et al. |
| 2012/0228013 | A1* | 9/2012 | Matienzo ............ H05K 3/225 174/258 |
| 2013/0233618 | A1 | 9/2013 | Kosuke et al. |
| 2013/0270001 | A1 | 10/2013 | Nakano et al. |
| 2013/0299219 | A1 | 11/2013 | Chisaka et al. |
| 2016/0107267 | A1 | 4/2016 | Ingham et al. |

FOREIGN PATENT DOCUMENTS

| | | |
|---|---|---|
| JP | 2002224821 A | 8/2002 |
| JP | 2003080392 A | 3/2003 |
| JP | 2003211289 A | 7/2003 |
| JP | 2003527971 A | 9/2003 |
| JP | 2003311469 A | 11/2003 |
| JP | 2004160515 A | 6/2004 |
| JP | 2005098133 A | 4/2005 |
| JP | 2005288458 A | 10/2005 |
| JP | 2005297011 A | 10/2005 |
| JP | 2006063421 A | 3/2006 |
| JP | 2007059506 A | 3/2007 |
| JP | 2008521619 A | 6/2008 |
| JP | 2010029870 A | 2/2010 |
| JP | 2010065916 A | 3/2010 |
| JP | 2010069795 A | 4/2010 |
| JP | 2012176433 A | 9/2012 |
| WO | WO 9809332 A1 | 3/1998 |
| WO | WO 2002099146 A1 | 12/2002 |
| WO | WO 2010093031 A | 8/2010 |
| WO | WO 2010122764 A1 | 10/2010 |
| WO | WO 2012108395 A | 8/2012 |

OTHER PUBLICATIONS

Written Opinion of the International Searching Authority issued for PCT/JP2015/050108, dated Apr. 14, 2015.

* cited by examiner

303

303

303

40

31(Cu-Ni)

32(Sn)

34

35(Cu)

US 10,994,366 B2

REPAIR METHOD AND REPAIR MATERIAL

CROSS REFERENCE TO RELATED APPLICATIONS

The present application is a divisional of application Ser. No. 15/183,025, filed Jun. 15, 2016, which is a continuation of International application No. PCT/JP2015/050108, filed Jan. 6, 2015, which claims priority to Japanese Patent Application No. 2014-000958, filed Jan. 7, 2014, and Japanese Patent Application No. 2014-155277, filed Jul. 30, 2014, the entire contents of each of which are incorporated herein by reference.

FIELD OF THE INVENTION

The present invention relates to a method for pairing a damaged part of a structural material, and a repair material to be used for the repair.

BACKGROUND OF THE INVENTION

A part of piping for passing a liquid or a gas may be damaged due to aging degradation or various external factors. As a method for repairing a damaged part of piping, for example, Patent Document 1 discloses a method of stopping up a hole by coated welding of a hole of a damaged part or by covering a damaged part with a reinforcing plate and welding the reinforcing plate.

Further, Patent Document 2 discloses a method in which a damaged part is repaired using a repair sheet formed by forming a conductive film made of copper or the like on one surface of a photocurable resin sheet including glass fibers. In this method, a damaged hole is stopped up by covering the damaged hole with a repair sheet, and then irradiating the resin sheet with light to cure the resin.

Patent Document 1: JP-A No. 2003-080392
Patent Document 2: JP-A No. 2010-069795

SUMMARY OF THE INVENTION

In the welding method described in Patent Document 1, since special apparatus/technique/qualifications for melting metal at a temperature of several thousands degrees are required, repair cannot be implemented simply.

In the method of using a resin sheet as described in Patent Document 2, heat resistance and durability are low. Further, in addition to taking much time to cure a resin, there are fears that an interface between a resin and a conductive film is degraded with time, or generally, a repair portion is damaged again since the resin absorbs moisture.

Although there is a method of using a common brazing metal material such as a solder, this method is low in workability since a melted brazing metal material flows during processing at high-temperatures and therefore the method requires great care, for example, holding in the repair material or stopping flowing of the repair material with an additional jig.

It is an object of the present invention to provide a repair method in which using a material capable of joining at a relatively low temperature as a repair material in a repair portion, repair that exhibits excellent sealing properties and durability even when used under a high-humidity and high-temperature environment is performed by a simple operation, and a repair material for the repair.

A repair method of the present invention includes a step of covering a damaged part of a member to be repaired with a repair material, and a step of heating the repair material to a predetermined temperature, wherein at least the surface of the member to be repaired includes a first metal, the repair material includes a second metal, and by the heating, the surface of the member to be repaired is integrally joined with a layer of an intermetallic compound and an alloy having a melting point higher than a melting point of a low melting point metal which is either of the first metal or the second metal.

Further, a repair method of the present invention includes a covering step of covering a damaged part of a member to be repaired with a repair material, and a heating step of heating the repair material to a predetermined temperature. The method also includes a step of forming a metal film containing a first metal on the surface of the member to be repaired prior to the heating step, the repair material includes a second metal, and by the heating, the surface of the member to be repaired is integrally joined with a layer of an intermetallic compound and an alloy having a melting point higher than a melting point of a low melting point metal which is either of the first metal or the second metal.

The repair material of the present invention includes a layer of a repair material containing a low melting point metal material and a high melting point metal material, and including an adhesive layer at a face at which repair material is in contact with the member to be repaired.

Further, the repair material of the present invention is formed by mixing, in the form of a putty, a powder composed of a low melting point metal having Sn as a main component and a powder composed of at least one high melting point metal selected from the group consisting of a Cu—Ni alloy, a Cu—Mn alloy, a Cu—Al alloy, a Cu—Cr alloy, and an Ag—Pd alloy with a resin component interposed between these powders.

Further, the repair material of the present invention contains a low melting point metal having Sn as a main component, at least one high melting point metal selected from the group consisting of a Cu—Ni alloy, a Cu—Mn alloy, a Cu—Al alloy, a Cu—Cr alloy, and an Ag—Pd alloy, and a binder resin, and the repair material can be formed into a sheet form. In this case, it is possible to prevent the repair material from coagulating or becoming a ball in contrast to a solder sheet, and it is possible to metallize the repair material in a state in which an external shape is nearly maintained.

In accordance with the present invention, by designating one of the first metal and the second metal as a low melting point metal, it becomes possible to implement a repair at a predetermined temperature (e.g., 250° C. to 400° C.) higher than the melting point of the low melting point metal.

In the case of repair by welding or an adhesive, a means is typically required which fixes articles to be used for joining until the end of joining by a support or application of pressure. However, in accordance with the present method, by just applying (patching) the repair material to the repair portion/filling the repair material in the repair portion, a joining reaction takes place in a short time while maintaining a shape of the repair material without the need for holding the articles by a support member or applying a pressure to the articles during heating, and therefore a repair operation becomes simple.

Further, since the repair portion (damaged part) is sealed with an intermetallic compound after repair, it is possible to implement repair which is excellent in sealing properties and free from time degradation. Further, since the melting point of the intermetallic compound is higher than that of the low melting point metal, it is also possible to apply to piping or the like used under a high-temperature environment of, for example, several hundred degrees.

Moreover, by using, as a repair material, a tape material which is prepared by applying a repair material to a foil of a high melting point metal or other high melting point substrate, even a damaged part having a larger opening can be easily repaired. Also in this case, a process of alloying proceeds rapidly at the time of melting a low melting point metal, and therefore it is possible to implement repair with reliability without holding the tape or applying a pressure to the tape separately.

DETAILED DESCRIPTION OF THE INVENTION

Hereinafter, a plurality of embodiments for embodying the present invention will be described with reference to the drawings, taking several specific examples. In drawings, like parts are denoted by the same reference symbols. These embodiments are just exemplifications, and it is to be understood that partial replacement or combination of constitutions described in different embodiments can be made. In Second Embodiment and subsequent embodiments, descriptions of a matter common to First Embodiment will be omitted, and only different points will be described. Particularly, like operation and effect based on like constitution will not be referred to for every embodiment.

First Embodiment

A repair method and a repair material of a first embodiment will be described in reference to FIG. 1 to FIG. 3. FIG. 1, FIG. 2 and FIG. 3 represent a step of repair in this order.

Figure 1A:
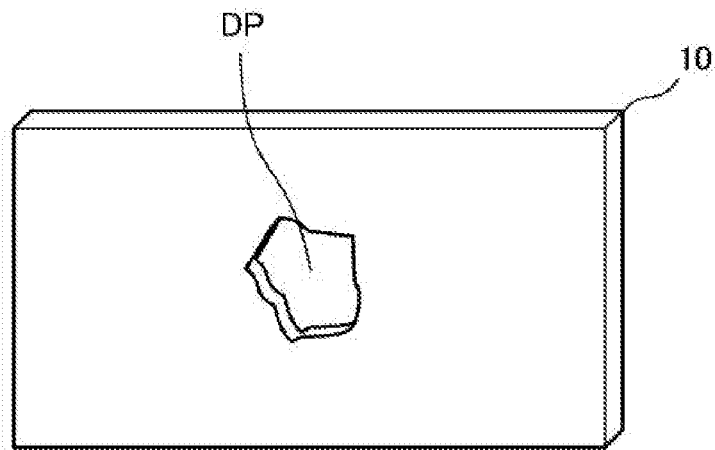
FIG. 1(A) is a perspective view of a member to be repaired.
Figure 1B:
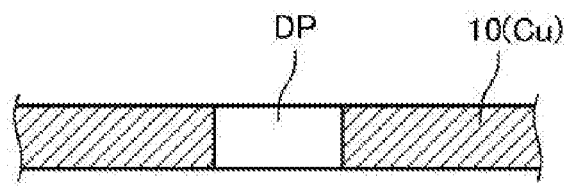
FIG. 1(B) is a sectional view of a repair portion of the member to be repaired.

FIG. 1(A) is a perspective view of a structural material to be repaired (member to be repaired), and FIG. 1(B) is a sectional view of a repair portion of the member to be repaired. The member to be repaired 10 is, for example, a Cu plate, and a damaged part (hole) DP is produced. In this embodiment, Cu of the Cu plate corresponds to "a first metal."

Figure 2A:
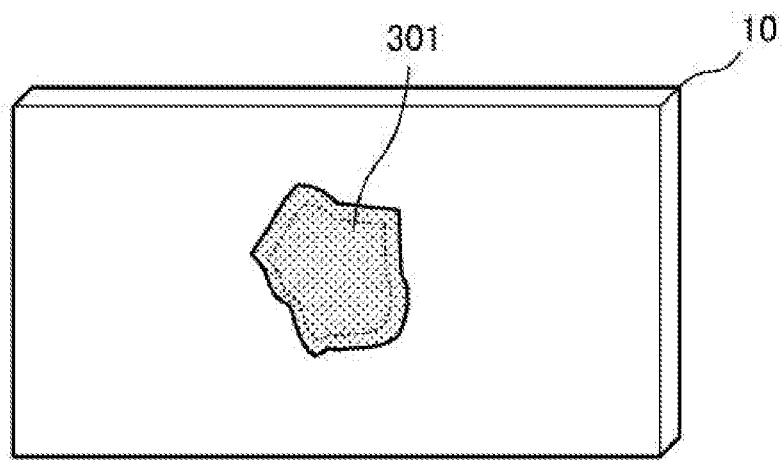
FIG. 2(A) is a perspective view of a state in which a repair material 301 is filled into a damaged part DP.
Figure 2B:
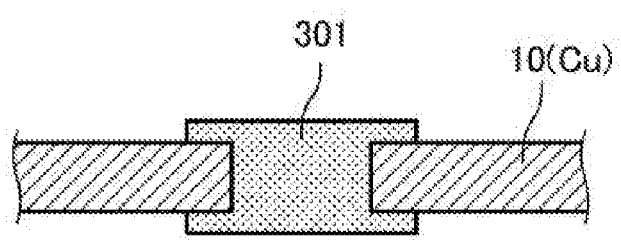
FIG. 2(B) is a sectional view of a repair portion of the damaged part DP.

FIG. 2(A) is a perspective view of a state in which a repair material 301 is filled into the damaged part DP, and FIG. 2(B) is a sectional view of a repair portion of the damaged part DP. As shown in FIG. 2(A), the repair material 301 is filled into the damaged part DP so as to fill a blank space of the damaged part DP.

The repair material 301 is a putty-like material prepared by kneading a Sn powder, a Cu—Ni alloy powder, a resin component and a reducing agent. Both of a particle size of the Sn powder and a particle size of the Cu—Ni powder are 0.5 to 30 µm, and percentages of the Cu—Ni powder and the Sn powder are, for example, (Sn: 55 wt %, Cu—Ni: 45 wt %), (Sn: 70 wt %, Cu—Ni: 30 wt %) and the like. The resin component 33 is one capable of forming the putty-like material, for example, epoxy, polyester, carboxymethyl cellulose and acrylic polymer. The reducing agent is, for example, a flux. A thickener may be added as required. In this embodiment, Sn of the Sn powder in the repair material 301 corresponds to "a second metal."

Figure 3A:
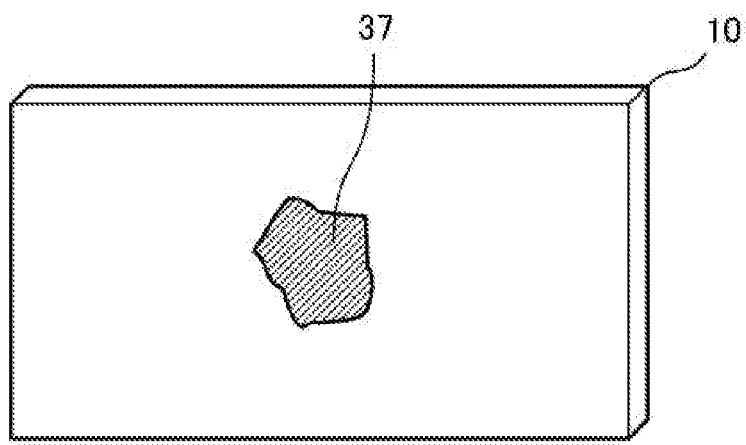
FIG. 3(A) is a perspective view of a state in which repair is completed by heating the repair material 301 and the vicinity thereof.
Figure 3B:
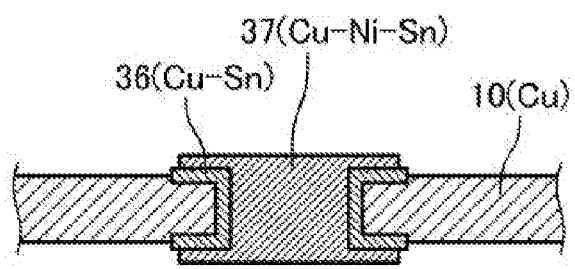
FIG. 3(B) is a sectional view of a repair portion of the damaged part DP.

Thereafter, the repair material 301 and the vicinity thereof are heated with hot air. FIG. 3(A) is a perspective view of a state in which repair is completed by heating the repair material 301 and the vicinity thereof, and FIG. 3(B) is a sectional view of a repair portion of the damaged part DP. A powder of a Cu—Ni alloy (high melting point metal) contained in the repair material 301 reacts with a powder of Sn (low melting point metal) to produce a Cu—Ni—Sn alloy layer 37 which is a high melting point reactant, through transient liquid phase diffusion (hereinafter, referred to as "TLP"). A principal intermetallic compound phase contained in the Cu—Ni—Sn alloy layer 37 is (Cu, Ni)$_6$Sn$_5$, and in addition to this, Cu$_2$NiSn is contained. Further, by a TLP reaction, a Cu—Sn layer 36 (TLP joint layer; transient liquid phase bonding layer) which is an intermetallic compound is formed at an interface between the member to be repaired 10 and the repair material 301.

A space between particles of the powders is filled with the resin component. A flux contained in the resin component is a reducing agent. Accordingly, there is the effect of making the surface of the member to be repaired 10 clean and removing an oxide film on the surface of each powder, and a reaction rate is more improved.

The above-mentioned heating temperature is a melting point of the Sn powder 32 or higher, and a melting point of the Cu—Ni alloy powder 31 or lower, and it is, for example, 250 to 350° C.

In order not to leave a layer of Sn alone in the alloy layer by the TLP reaction, percentages of the Cu—Ni alloy powder and the Sn powder are preferably defined. For example, percentages are (Sn: 55 wt %, Cu—Ni: 45 wt %), (Sn: 70 wt %, Cu—Ni: 30 wt %) or the like. Further, a heating temperature is a temperature in the condition in which elemental Sn does not remain, and it is, for example, 1 to 10 minutes.

In this manner, the TLP proceeds at relatively low temperatures, and the melting point varies to, for example, 400° C. or higher. The melting point of (Cu, Ni)$_6$Sn$_5$ which is a principal intermetallic compound phase is about 435° C. In addition, in the case where Sn remains in the Cu—Ni—Sn alloy layer, heat resistance at 400° C. can be secured even though about 10 to 20 wt % of elemental Sn remains.

In accordance with the present embodiment, particularly, since the low melting point metal of a raw material component is Sn and the high melting point metal of a raw material component is a Cu alloy, the high melting point reactant (intermetallic compound) is formed in a short time at low temperatures to obtain a joint structure having high heat resistance.

Second Embodiment

Figure 4A:
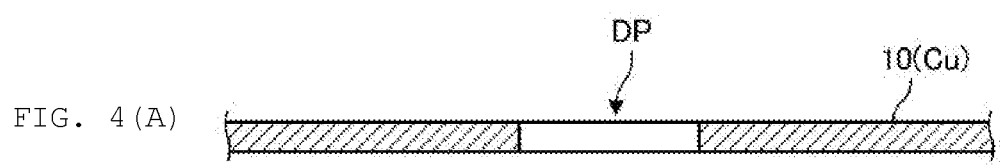
FIG. 4(A) is a sectional view of a member to be repaired of Second Embodiment.
Figure 4B:
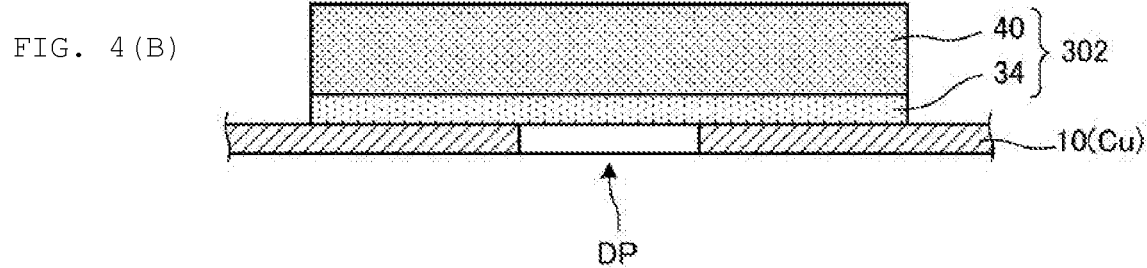
FIG. 4(B) is a sectional view of a state in which a repair material is patched to a repair portion of the member to be repaired.
Figure 4C:
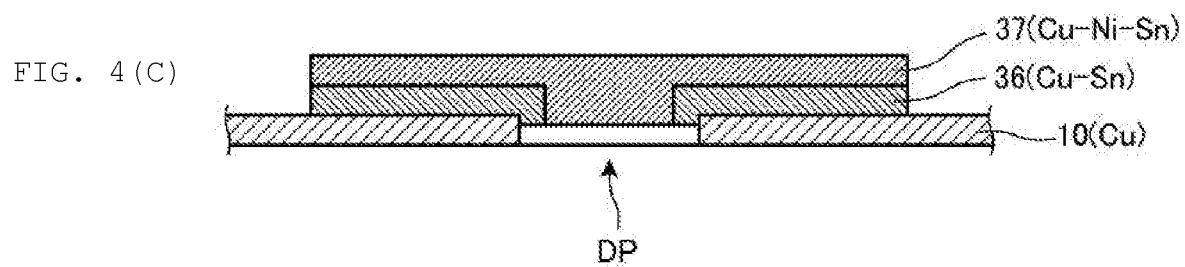
FIG. 4(C) is a sectional view of a state in which repair is completed.
Figure 5:
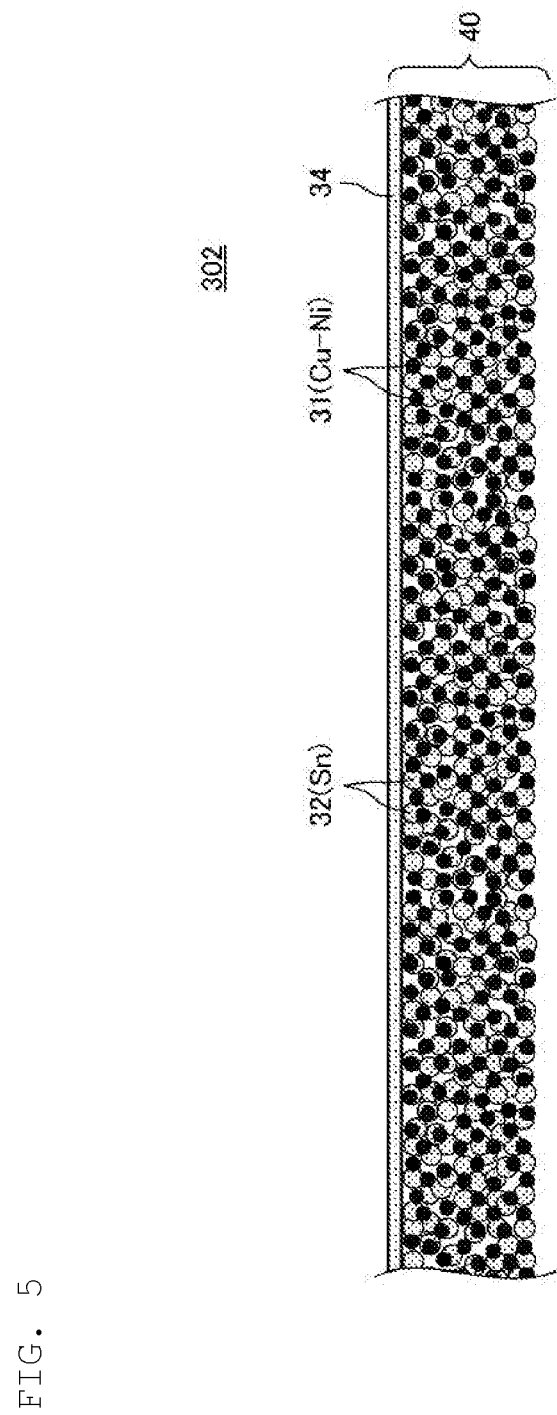
FIG. 5 is a sectional view of a repair material 302.

FIG. 4(A) is a sectional view of a member to be repaired of Second Embodiment, FIG. 4(B) is a sectional view of a state in which a repair material is patched to a repair portion of the member to be repaired, and FIG. 4(C) is a sectional view of a state in which repair is completed. FIG. 5 is a sectional view of a repair material 302.

The joining material 302 shown in FIG. 5 is a repair sheet provided with a mixed layer of a raw-material component for forming a TLP layer, and a resin component that softens and flows during heat treatment. The repair material 302 includes a thick film joining material of Sn+Cu—Ni 40. The joining material 40 contains a Cu—Ni alloy powder (high melting point metal powder) 31 having particle sizes of, for example, 0.5 to 30 µm, and a Sn powder (low melting point metal powder) 32 having particle sizes of 0.5 to 30 µm. A resin component of the joining material 40 is principally a binder and a flux. One surface of the above-mentioned joining material 40 is covered with an adhesive layer 34.

The member to be repaired 10 is, for example, a Cu plate, and a damaged part DP is present in the member to be repaired 10, as shown in FIG. 4(A). In repairing the member to be repaired, as shown in FIG. 4(B), the damaged part DP is patched with the repair material 302 first.

Thereafter, the repair material 302 and the vicinity thereof are heated with hot air. Thereby, as shown in FIG. 4(C), a Cu—Ni powder contained in the repair material 302 reacts with a Sn powder to produce a Cu—Ni—Sn alloy layer 37 which is a high melting point reactant, through TLP. A principal intermetallic compound phase contained in the Cu—Ni—Sn alloy layer 37 is (Cu, Ni)$_6$Sn$_5$, and in addition to this, Cu$_2$NiSn is contained. Further, by TLP, a Cu—Sn layer 36 which is an intermetallic compound is formed at an interface between the member to be repaired 10 and the joining material 40.

In addition, it is preferred that the flux is contained in the adhesive layer 34. Thereby, there is the effect of making the surface of the member to be repaired 10 clean (removal of an oxide film) and a reaction rate is more improved.

In this manner, the TLP proceeds at relatively low temperatures, and a Cu—Ni—Sn alloy layer 37 having the melting point of, for example, 400° C. or higher is formed. The melting point of (Cu, Ni)$_6$Sn$_5$ which is a principal intermetallic compound phase is about 435° C.

In accordance with the present embodiment, a damaged part DP can be covered with a member having high heat resistance by just patching the repair material 302 and heating it at a relatively low temperature.

Third Embodiment

Figure 8A:
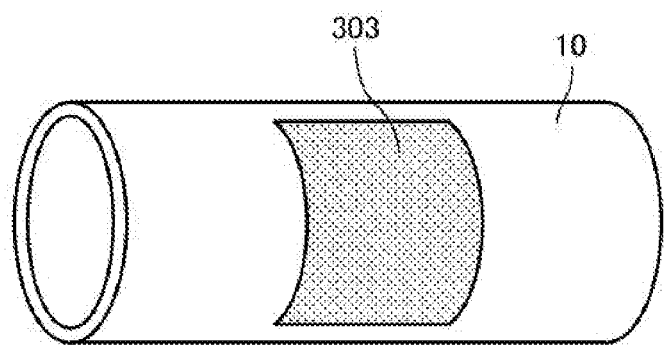
FIG. 8(A) is a perspective view of a state in which repair is completed by heating the repair material 303 and the vicinity thereof.
Figure 8B:
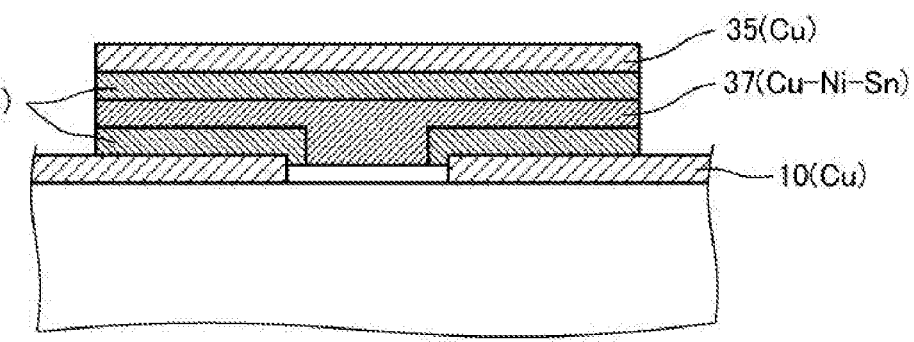
FIG. 8(B) is a sectional view of a repair portion of the damaged part.
Figure 9A:
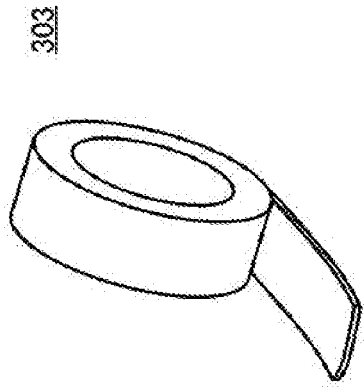
FIG. 9(A) is a perspective view of the repair material 303.
Figure 9B:
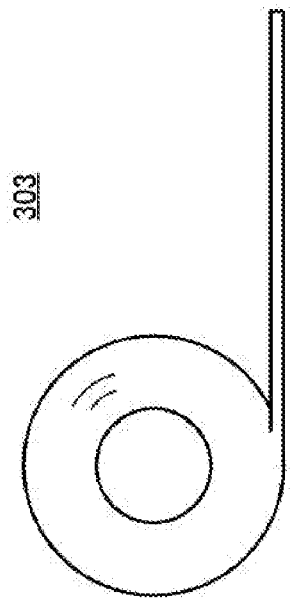
FIG. 9(B) is a front view thereof.

In Third Embodiment, an example of repair of a piping partially damaged (opened) will be described with reference to FIG. 6 to FIG. 9. FIG. 6, FIG. 7 and FIG. 8 represent a step of repair in this order. FIG. 9(A) is a perspective view of the repair material 303, FIG. 9(B) is a front view thereof, and FIG. 9(C) is a partially enlarged sectional view.

Figure 9C:
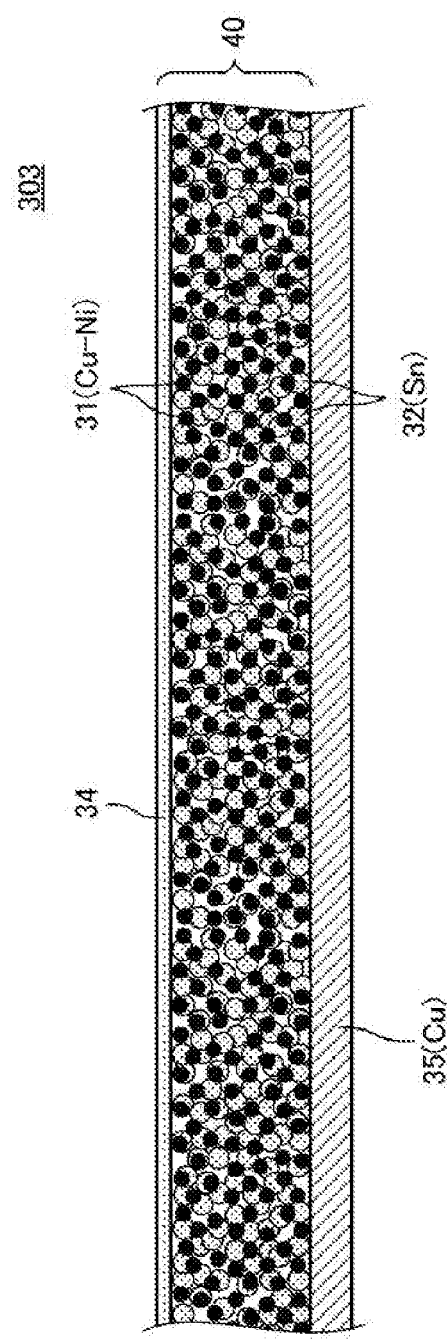
FIG. 9(C) is a partially enlarged sectional view.

As shown in FIG. 9(C), the repair material 303 is obtained by forming a thick film joining material 40 on a flexible substrate sheet 35 such as Cu. A constitution of the joining material 40 is the same as the joining material 40 shown in FIG. 5 in Second Embodiment. That is, the repair material 303 is formed by applying, onto a substrate sheet 35, a paste-like material obtained by kneading a material including the Cu—Ni alloy powder 31 and the Sn powder 32 in a certain ratio together with a resin component such as a binder and a flux to form them into a paste. An adhesive layer 34 is applied onto the surface of the joining material 40.

Figure 6A:
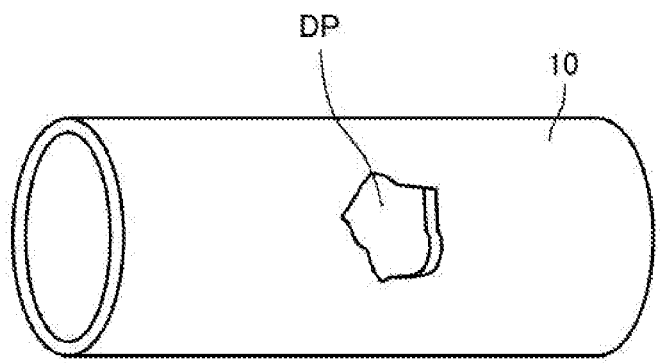
FIG. 6(A) is a perspective view of a member to be repaired of Third Embodiment.
Figure 6B:
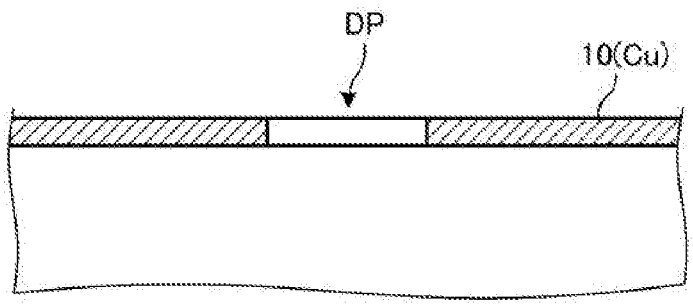
FIG. 6(B) is a sectional view of a repair portion of the member to be repaired.

FIG. 6(A) is a perspective view of a member to be repaired, and FIG. 6(B) is a sectional view of a repair portion of the member to be repaired. The member to be repaired 10 is, for example, a Cu tube, and a damaged part (hole) DP is produced.

Figure 7A:
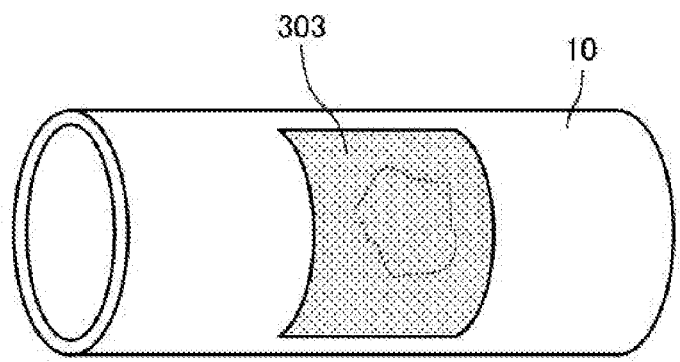
FIG. 7(A) is a perspective view of a state in which a repair material 303 is patched to a damaged part DP.
Figure 7B:
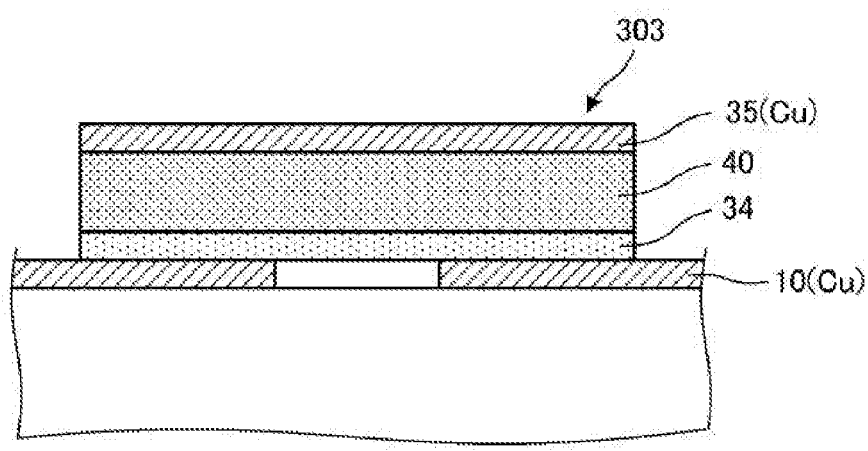
FIG. 7(B) is a sectional view of a repair portion of the damaged part DP.

FIG. 7(A) is a perspective view of a state in which a repair material 303 is patched to the damaged part DP, and FIG. 7(B) is a sectional view of a repair portion of the damaged part DP. As shown in FIG. 7(A), by using adhesion of the adhesive layer 34 of the repair material 303, the repair material 303 is patched so as to block the damaged part DP.

Thereafter, the repair material 303 and the vicinity thereof are heated with hot air. FIG. 8(A) is a perspective view of a state in which repair is completed by heating the repair material 303 and the vicinity thereof, and FIG. 8(B) is a sectional view of a repair portion of the damaged part DP. A Cu—Ni alloy powder contained in the repair material 303 reacts with a Sn powder to produce a Cu—Ni—Sn alloy layer 37 which is a high melting point reactant. A principal intermetallic compound phase contained in the Cu—Ni—Sn alloy layer 37 is (Cu, Ni)$_6$Sn$_5$, and in addition to this, Cu$_2$NiSn is contained. Further, a Cu—Sn layer 36 which is an intermetallic compound is formed at an interface between the member to be repaired 10 and the joining material 40. Similarly, a Cu—Sn layer 36 which is an intermetallic compound is formed at an interface between the substrate sheet 35 and the joining material 40.

In this manner, the TLP proceeds at relatively low temperatures, and a Cu—Ni—Sn alloy layer 37 having the melting point of, for example, 400° C. or higher is formed. The melting point of (Cu, Ni)$_6$Sn$_5$ which is a principal intermetallic compound phase is about 435° C.

In accordance with the present embodiment, repair of a piping can be performed by just patching the repair material 303 and heating it at a relatively low temperature.

Fourth Embodiment

Figure 10A:
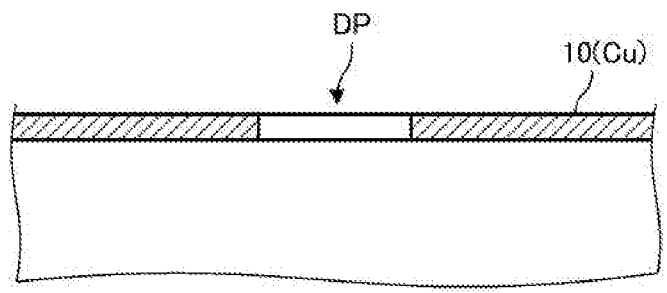
FIG. 10(A) is a sectional view of a member to be repaired of Fourth Embodiment.
Figure 10B:
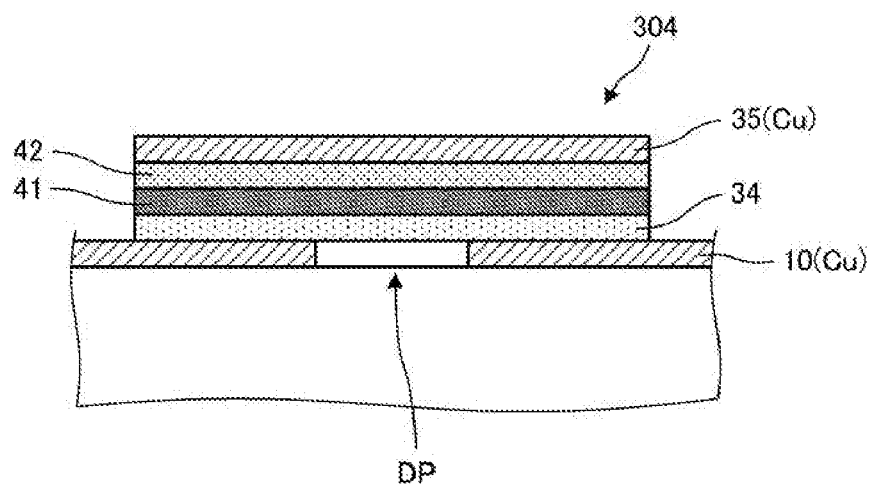
FIG. 10(B) is a sectional view of a state in which a repair material is patched to a repair portion of the member to be repaired.
Figure 10C:
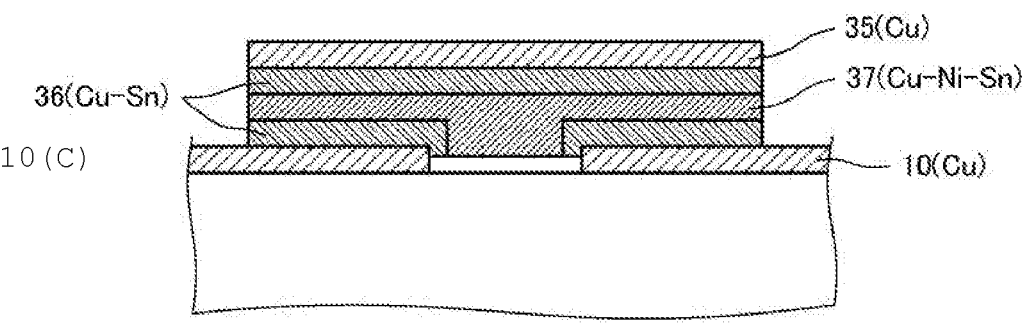
FIG. 10(C) is a sectional view of a state in which repair is completed.
Figure 11:
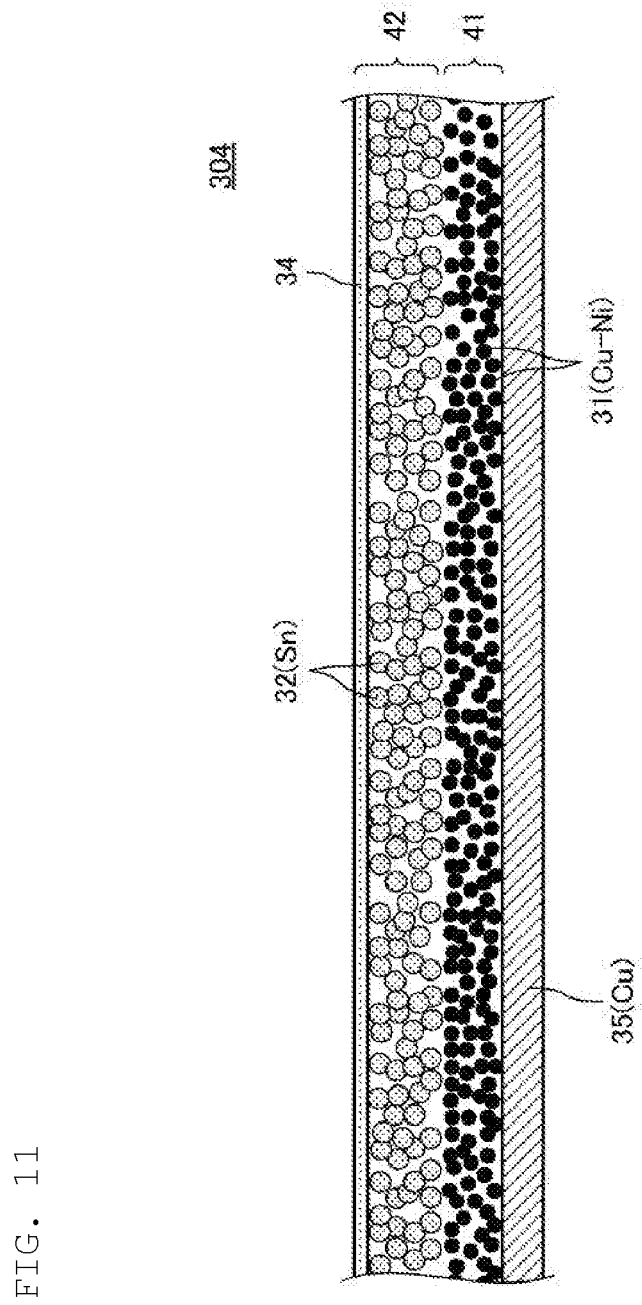
FIG. 11 is a sectional view of a repair material 304.

FIG. 10(A) is a sectional view of a member to be repaired of Fourth Embodiment, FIG. 10(B) is a sectional view of a state in which a repair material is patched to a repair portion of the member to be repaired, and FIG. 10(C) is a sectional view of a state in which repair is completed. FIG. 11 is a sectional view of a repair material 304.

The repair material 304 shown in FIG. 11 is a repair sheet provided with a mixed layer of a raw-material component which causes TLP, and a resin component that softens and flows during heat treatment. The repair material 304 includes a thick film joining material of Cu—Ni 41 and a thick film joining material of Sn 42. The joining material 41 contains a Cu—Ni alloy powder (high melting point metal powder) 31 having particle sizes of, for example, 0.5 to 30 µm, and the joining material 42 contains a Sn powder (low melting point metal powder) 32 having particle sizes of, for example, 0.5 to 30 µm.

The joining material 41 is formed by kneading the Cu—Ni alloy powder 31 with a resin component such as a binder and a flux to form them into a paste, and the joining material 42 is formed by kneading the Sn powder 32 together with a resin component such as a binder and a flux to form them into a paste. The joining material 41 is applied onto a substrate sheet 35 to form a layer, the joining material 42 is applied onto the layer surface, and further an adhesive layer 34 is formed thereon by an application, and thereby, the repair material 304 is constituted.

The member to be repaired 10 is, for example, a Cu tube, and a damaged part DP is present in the member to be repaired 10, as shown in FIG. 10(A). In repairing the member to be repaired, as shown in FIG. 10(B), the damaged part DP is patched with the repair material 304 first.

Thereafter, the repair material 304 and the vicinity thereof are heated with hot air. Thereby, as shown in FIG. 10(C), a Cu—Ni powder contained in the repair material 304 reacts with a Sn powder to produce a Cu—Ni—Sn alloy layer 37 which is a high melting point reactant. A principal intermetallic compound phase contained in the Cu—Ni—Sn alloy layer 37 is (Cu, Ni)$_6$Sn$_5$, and in addition to this, Cu$_2$NiSn is contained. Further, a Cu—Sn layer 36 which is an intermetallic compound is formed at an interface between the member to be repaired 10 and the joining materials (41, 42). Similarly, a Cu—Sn layer 36 which is an intermetallic compound is formed at an interface between the substrate sheet 35 and the joining materials (41, 42).

Since Cu in the substrate is easily alloyed with the Sn powder, a thick Cu—Sn layer tends to be formed at an interface between the joining material and the substrate sheet 35; however, in accordance with the present embodiment, a Cu—Ni thick film layer is formed on a side of the substrate sheet 35 of a Cu foil or the like (Sn thick film layer 42 is separated from the Cu foil), and therefore the above problem is suppressed. That is, in comparison with an example shown in FIG. 9, there is a possibility of keeping alloying of Cu in the substrate with Sn from anteceding during raising a temperature to improve joint strength of the repair material 304.

Fifth Embodiment

Figure 12A:
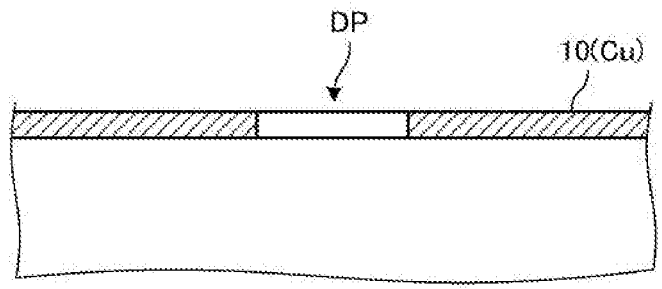
FIG. 12(A) is a sectional view of a member to be repaired of Fifth Embodiment.
Figure 12B:
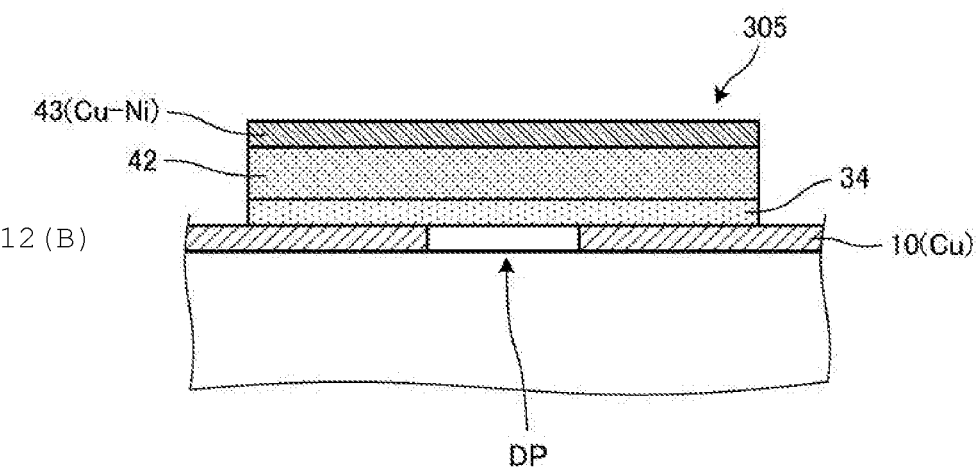
FIG. 12(B) is a sectional view of a state in which a repair material is patched to a repair portion of the member to be repaired.
Figure 12C:
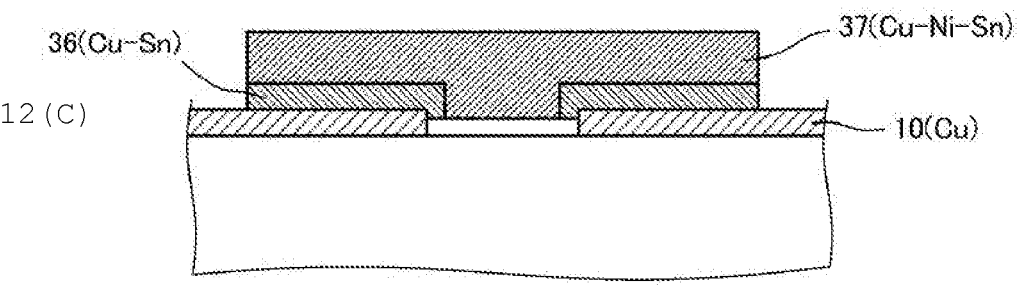
FIG. 12(C) is a sectional view of a state in which repair is completed.
Figure 13:
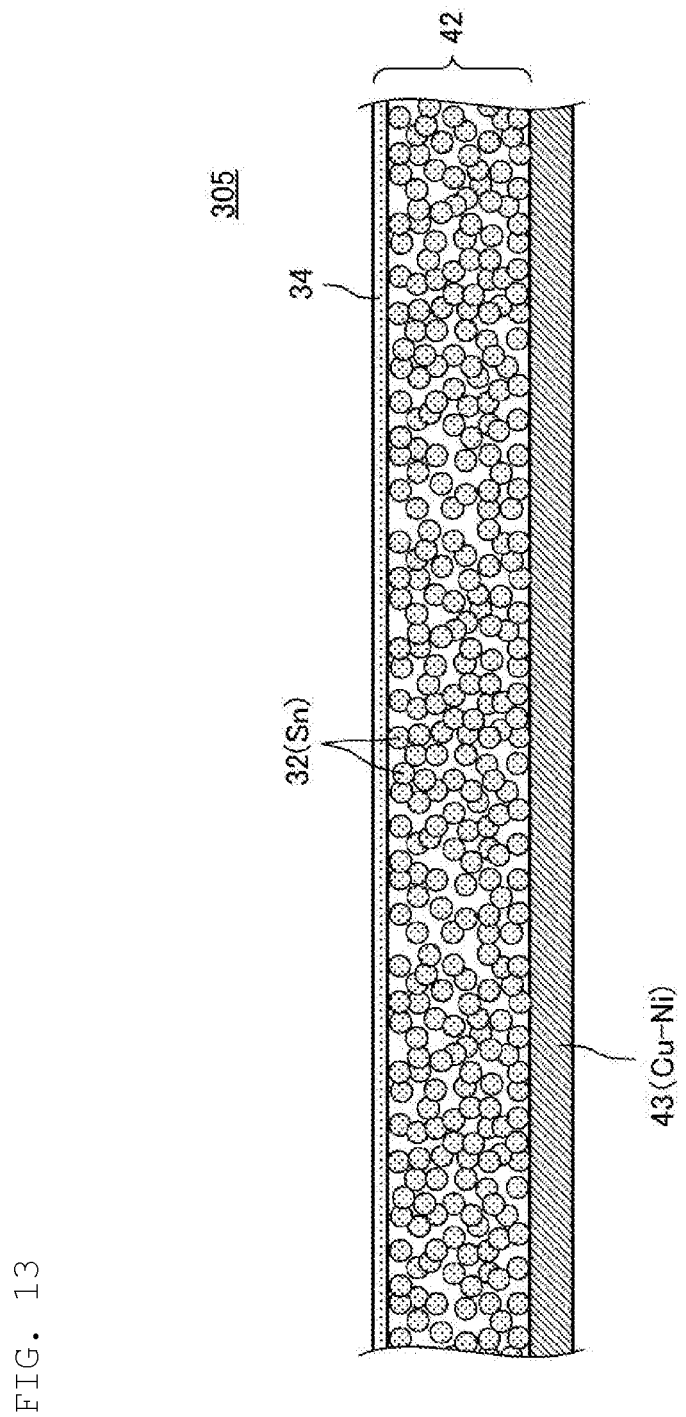
FIG. 13 is a sectional view of a repair material 305.

FIG. 12(A) is a sectional view of a member to be repaired of Fifth Embodiment, FIG. 12(B) is a sectional view of a state in which a repair material is patched to a repair portion of the member to be repaired, and FIG. 12(C) is a sectional view of a state in which repair is completed. FIG. 13 is a sectional view of a repair material 305.

The repair material 305 shown in FIG. 13 is a repair sheet provided with a mixed layer of a raw-material component which causes TLP, and a resin component that softens and flows during heat treatment. The repair material 305 includes a thick film joining material of Sn 42. The joining material 42 is formed by kneading the Sn powder (low melting point metal powder) 32 having particle sizes of, for example, 0.5 to 30 µm together with a resin component such as a binder and a flux to form them into a paste.

The joining material 42 is applied onto a substrate sheet 35 to form a layer, and an adhesive layer 34 is formed thereon by an application.

The member to be repaired 10 is, for example, a Cu tube, and a damaged part DP is present in the member to be repaired 10, as shown in FIG. 12(A). In repairing the member to be repaired, as shown in FIG. 12(B), the damaged part DP is patched with the repair material 305 first.

Thereafter, the repair material 305 and the vicinity thereof are heated with hot air. Thereby, as shown in FIG. 12(C), a Sn powder 32 contained in the repair material 305 reacts with a substrate sheet (Cu—Ni foil) 43 to produce a Cu—Ni—Sn alloy layer 37 which is a high melting point reactant. A principal intermetallic compound phase contained in the Cu—Ni—Sn alloy layer 37 is (Cu, Ni)$_6$Sn$_5$, and in addition to this, Cu$_2$NiSn is contained. Further, a Cu—Sn layer 36 which is an intermetallic compound is formed at an interface between the member to be repaired 10 and the joining material 42.

Sixth Embodiment

Figure 14A:
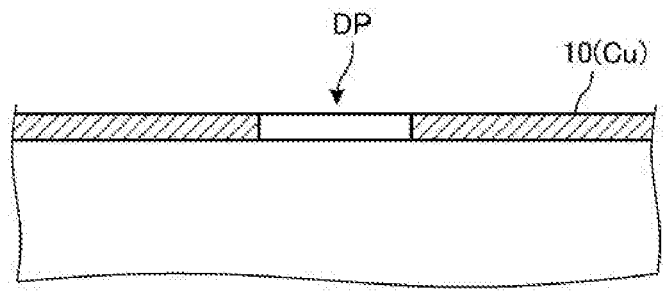
FIG. 14(A) is a sectional view of a member to be repaired of Sixth Embodiment.
Figure 14B:
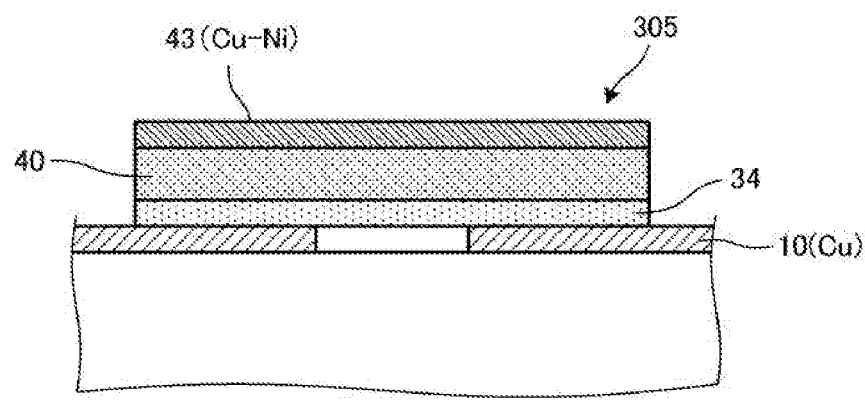
FIG. 14(B) is a sectional view of a state in which a repair material is patched to a repair portion of the member to be repaired.
Figure 14C:
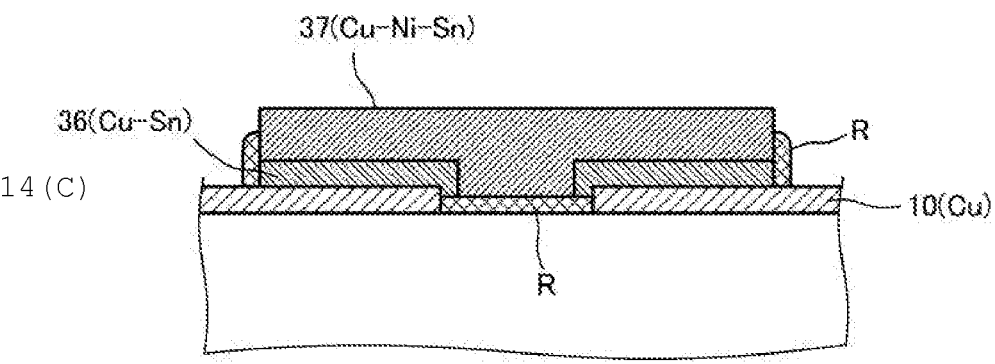
FIG. 14(C) is a sectional view of a state in which repair is completed.
Figure 15:
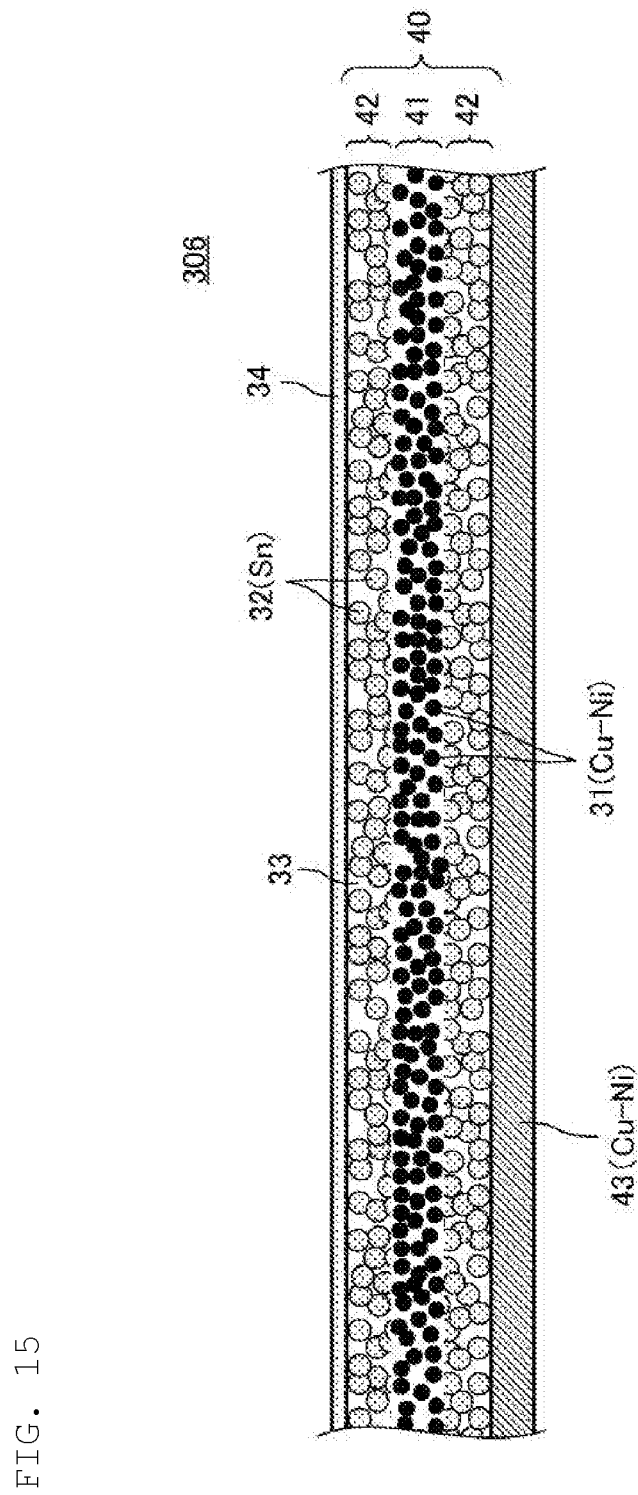
FIG. 15 is a sectional view of a repair material 306.

FIG. 14(A) is a sectional view of a member to be repaired of Sixth Embodiment, FIG. 14(B) is a sectional view of a state in which a repair material is patched to a repair portion of the member to be repaired, and FIG. 14(C) is a sectional view of a state in which repair is completed. FIG. 15 is a sectional view of a repair material 306.

The repair material 306 shown in FIG. 15 is a repair sheet provided with a mixed layer of a raw-material component which causes TLP, and a resin component that softens and flows during heat treatment. The repair material 306 includes a thick film joining material of Cu—Ni 41 and a thick film joining material of Sn 42. The joining material 41 contains a Cu—Ni alloy powder (high melting point metal powder) 31 having particle sizes of, for example, 0.5 to 30 µm, and the joining material 42 contains a Sn powder (low melting point metal powder) 32 having particle sizes of, for example, 0.5 to 30 µm.

The joining material 41 is formed by kneading the Cu—Ni alloy powder 31 with a resin component such as a binder and a flux to form them into a paste, and the joining material 42 is formed by kneading the Sn powder 32 together with a resin component such as a binder and a flux to form them into a paste. A resin component 33 is also illustrated in FIG. 15. The joining material 42 is applied onto a substrate sheet (Cu—Ni foil) 43 to form a layer, the joining material 41 is applied onto the layer surface, the joining material 42 is applied onto the surface of the joining material 41, and further an adhesive layer 34 is formed thereon by an application, and thereby, the repair material 306 is constituted. In addition, the joining materials 41 and 42 may be each formed into a sheet form and then laminated as a method other than an application method.

The member to be repaired 10 is, for example, a Cu tube, and a damaged part DP is present in the member to be repaired 10, as shown in FIG. 14(A). In repairing the member to be repaired, as shown in FIG. 14(B), the damaged part DP is patched with the repair material 306 first.

Thereafter, the repair material 306 and the vicinity thereof are heated with hot air. Thereby, as shown in FIG. 14(C), a Cu—Ni powder contained in the repair material 306 reacts with a Sn powder to produce a Cu—Ni—Sn alloy layer 37 which is a high melting point reactant. A principal intermetallic compound phase contained in the Cu—Ni—Sn alloy layer 37 is (Cu, Ni)$_6$Sn$_5$, and in addition to this, Cu$_2$NiSn is contained. Further, a Cu—Sn layer 36 which is an intermetallic compound is formed at an interface between the member to be repaired 10 and the joining material 40.

The resin component 33 in the joining material 40 is going to be extruded outward according to the TLP reaction, and consequently a resin film R which is an exudate of the resin component 33 is formed on a lateral circumferential (exposed) portion of the Cu—Ni—Sn alloy layer. The lateral circumferential (exposed) portion of the Cu—Ni—Sn alloy layer is covered with the resin film R.

In accordance with the present embodiment, since the Cu—Ni—Sn alloy layer is coated with the resin layer, a joint state of the member to be repaired 10, the Cu—Sn intermetallic compound layer and the Cu—Ni—Sn alloy layer 37 can be easily stabilized, and the strength of the joint portion can be improved.

In addition, since an interface between the Cu—Ni—Sn layer and the Cu—Ni layer is low in joint strength, the Cu—Ni preferably does not remain. In accordance with the present embodiment, the Cu—Ni thick film joining material 41 is separated from the substrate sheet 43 such as Cu—Ni foil or the like, and therefore this problem is suppressed. That is, the Cu—Ni reacts with Sn in the Sn thick film joining material 42 and increasingly alloyed to Cu—Ni—Sn, and Cu—Ni hardly remains. Consequently, joint strength of the repair material 306 is improved.

Seventh Embodiment

In Seventh Embodiment, repair of a structural body made of stainless steel (SUS) will be described with reference to FIG. 16 to FIG. 18. FIG. 16, FIG. 17 and FIG. 18 represent a step of repair in this order.

Figure 16A:
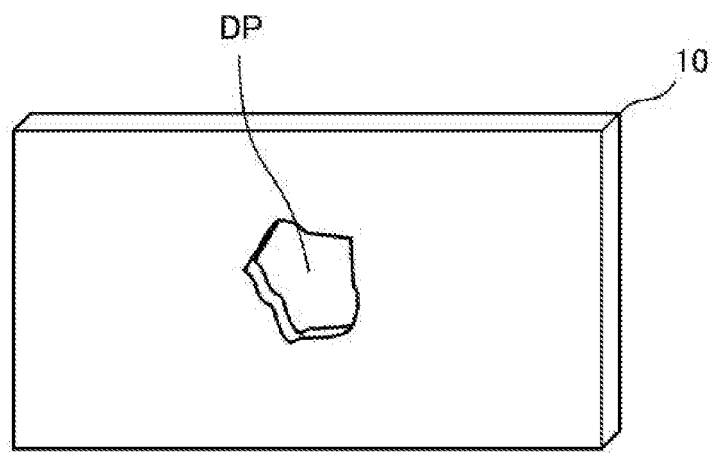
FIG. 16(A) is a perspective view of a member to be repaired 10 of Seventh Embodiment.
Figure 16B:
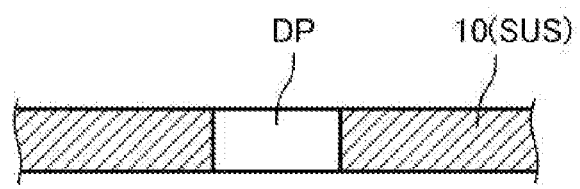
FIG. 16(B) is a sectional view of a repair portion of the member to be repaired.

FIG. 16(A) is a perspective view of a member to be repaired 10, and FIG. 16(B) is a sectional view of a repair portion of the member to be repaired. The member to be repaired 10 is a SUS plate, and a damaged part (hole) DP is produced.

Figure 17A:
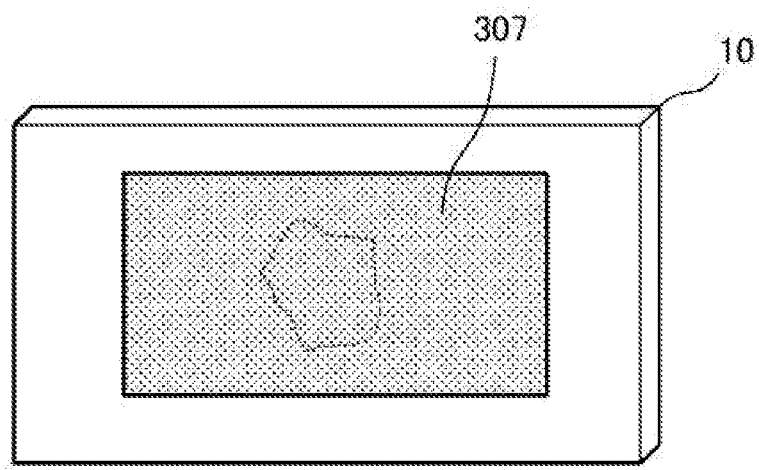
FIG. 17(A) is a perspective view of a state in which a repair material 307 is patched to a damaged part DP.
Figure 17B:
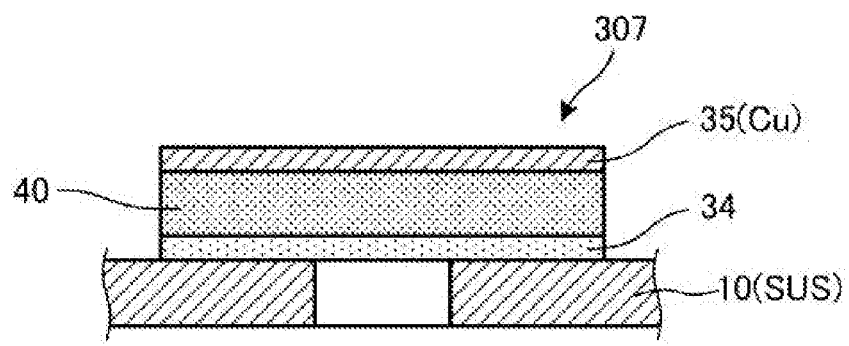
FIG. 17(B) is a sectional view of a repair portion of the damaged part DP.

FIG. 17(A) is a perspective view of a state in which a repair material 307 is patched to the damaged part DP, and FIG. 17(B) is a sectional view of a repair portion of the damaged part DP. As shown in FIG. 17(A), the repair material 307 is patched to the damaged part DP so as to fill a blank space of the damaged part DP. In addition, a flux may be applied to the repair portion member to be repaired 10 before patching the repair material 307. Thereby, an oxide film on the surface of the member to be repaired 10 is effectively removed and a clean surface is quickly exposed.

A constitution of the above-mentioned repair material 307 is the same as the repair material 303 shown in FIG. 9(C). However, a resin component includes a flux for stainless steel.

Figure 18A:
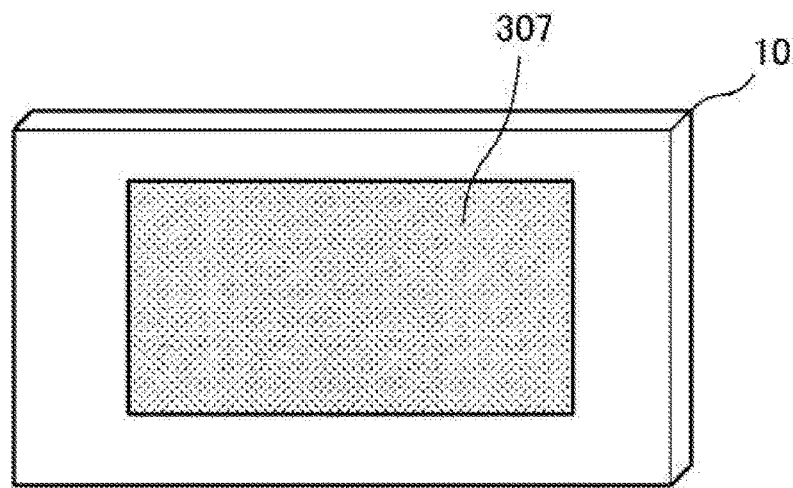
FIG. 18(A) is a perspective view of a state in which repair is completed by heating the repair material 307 and the vicinity thereof.
Figure 18B:
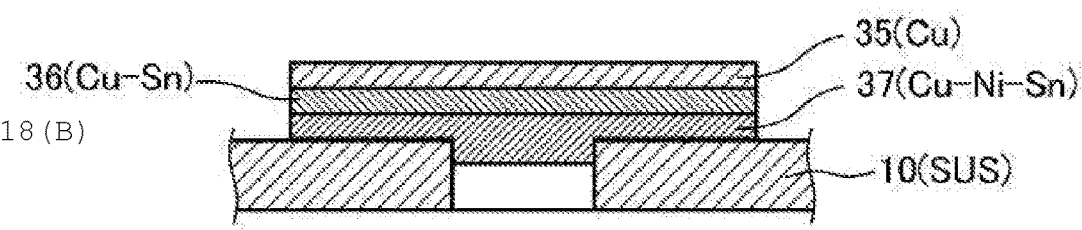
FIG. 18(B) is a sectional view of a repair portion of the damaged part DP.

Thereafter, the repair material 307 and the vicinity thereof are heated with hot air. FIG. 18(A) is a perspective view of a state in which repair is completed by heating the repair material 307 and the vicinity thereof, and FIG. 18(B) is a sectional view of a repair portion of the damaged part DP. A Cu—Ni alloy powder contained in the repair material 307 reacts with a Sn powder to produce a Cu—Ni—Sn alloy layer 37 which is a high melting point reactant. A Cu—Ni—Sn alloy constituting the Cu—Ni—Sn alloy layer 37 is an intermetallic compound (Cu$_2$NiSn, etc.). Further, a Cu—Sn layer 36 which is an intermetallic compound is formed at an interface between the substrate sheet 35 and the joining material 40. A reaction layer with SUS (FeSn2) may be slightly formed at an interface between the member to be repaired 10 and the joining material 40. A melting point of the reaction layer is higher than that of Sn.

Since a reaction temperature between a Fe-based alloy such as stainless steel and Sn is high, a heating temperature is set to, for example, 350° C. to 500° C.

Eighth Embodiment

Figure 19A:
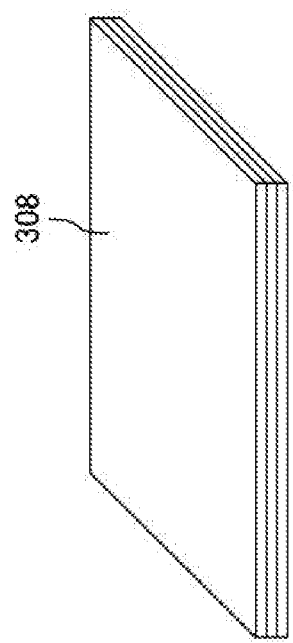
FIG. 19(A) is a perspective view of a repair material of Eighth Embodiment.
Figure 19B:
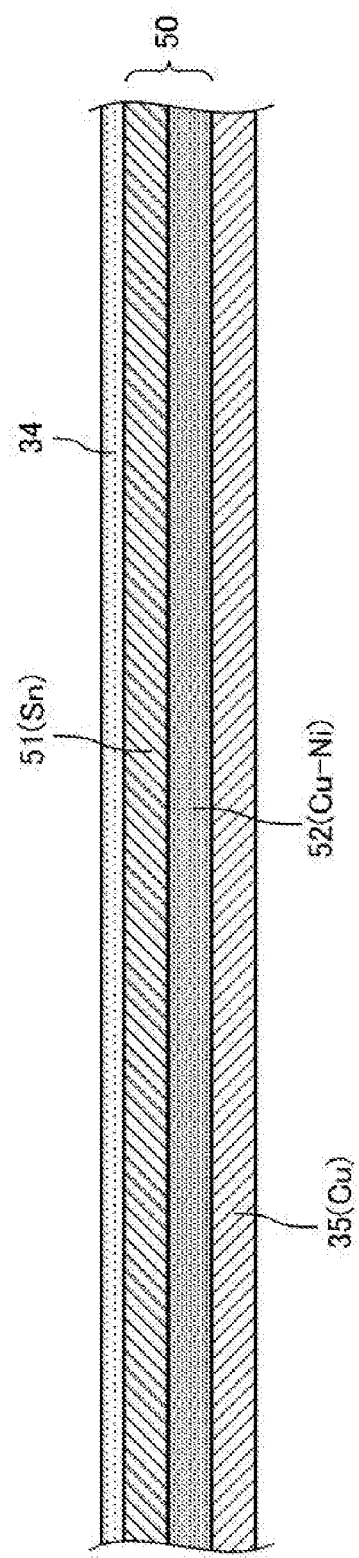
FIG. 19(B) is a sectional view thereof.

FIG. 19(A) is a perspective view of a repair material of Eighth Embodiment, and FIG. 19(B) is a sectional view thereof. The repair material 308 is one in which a joint layer 50 is formed on a substrate sheet 35 such as a Cu foil, and the adhesive layer 34 is formed on the surface of the joint layer 50. The joint layer 50 is composed of a Cu—Ni layer 52 and a Sn layer 51. The Cu—Ni layer 52 is a foil or a plating film. The Sn layer 51 is also a foil or a plating film. When both the Cu—Ni layer 52 and the Sn layer 51 are formed of the foil, these are bonded together with the substrate sheet 35. When these joint layers are formed of the plating film, a plating film of Cu—Ni is formed on the substrate sheet 35, and a Sn plating film is further formed thereon.

When repair is performed with use of the repair material 308, as shown in Second Embodiment or Seventh Embodiment, the repair material is patched to a repair portion of a member to be repaired and heated to a predetermined temperature. Thereby, Cu—Ni of the Cu—Ni layer 52 reacts with Sn of the Sn layer 51 through a TLP reaction to produce a Cu—Ni—Sn alloy layer between the member to be repaired and the substrate sheet 35. A principal intermetallic compound phase contained in the Cu—Ni—Sn alloy layer 37 is $(Cu, Ni)_6Sn_5$, and in addition to this, $Cu_2NiSn$ is contained. That is, the damaged part is repaired by being covered with the substrate sheet 35 with the Cu—Ni—Sn alloy layer interposed therebetween.

In accordance with the present embodiment, the joint layer 50 is formed of a foil or a plating film, a more compact alloy layer is formed by heating.

Ninth Embodiment

In Ninth Embodiment, an example of repair of a nonmetallic structural body will be described with reference to FIG. 20 to FIG. 23. FIG. 20 to FIG. 23 represent a step of repair in this order.

Figure 20A:
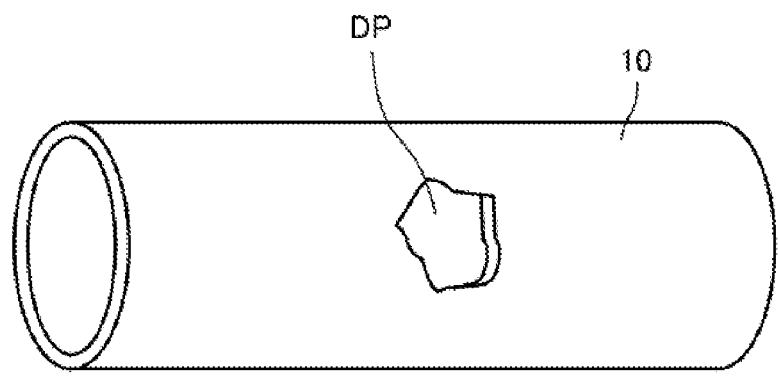
FIG. 20(A) is a perspective view of a member to be repaired of Ninth Embodiment.
Figure 20B:
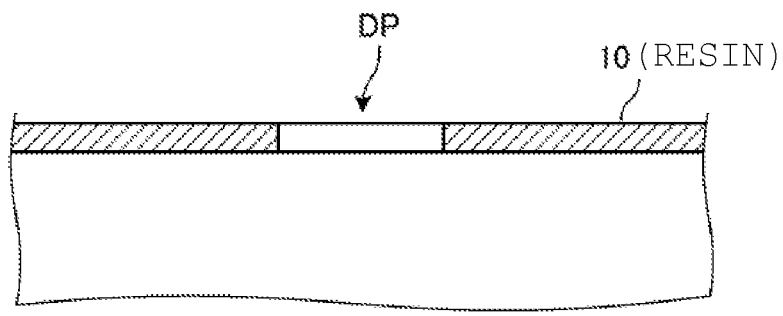
FIG. 20(B) is a sectional view of a repair portion of the member to be repaired.

FIG. 20(A) is a perspective view of a member to be repaired, and FIG. 20(B) is a sectional view of a repair portion of the member to be repaired. The member to be repaired 10 is, for example, a resin tube of vinyl chloride or the like, and a damaged part (hole) DP is produced.

Figure 21A:
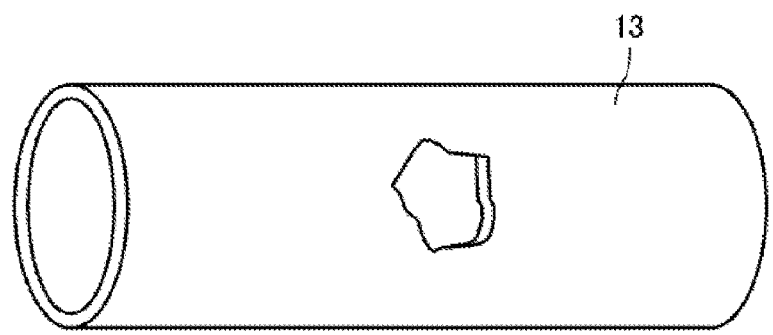
FIG. 21(A) is a perspective view after forming a plating film 13.
Figure 21B:
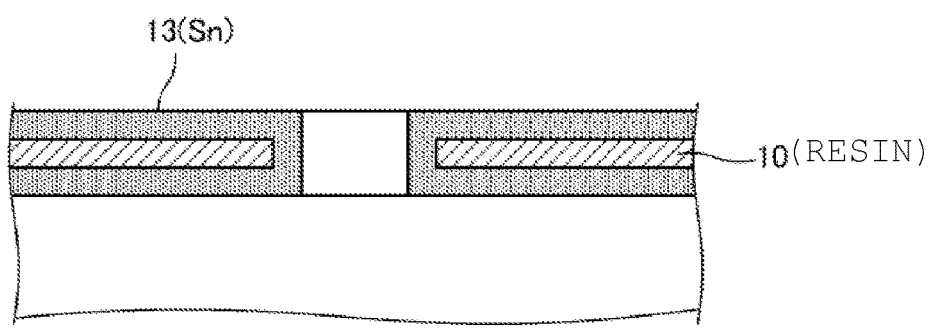
FIG. 21(B) is a sectional view of a repair portion of the member to be repaired.

When repair of the nonmetallic structural body is performed, at least the repair portion (periphery of the damaged part) of the member to be repaired is provided with a Sn-plating having a thickness of 2 to 5 μm first. FIG. 21(A) is a perspective view after forming a plating film 13, and FIG. 21(B) is a sectional view of a repair portion of the member to be repaired.

Figure 22A:
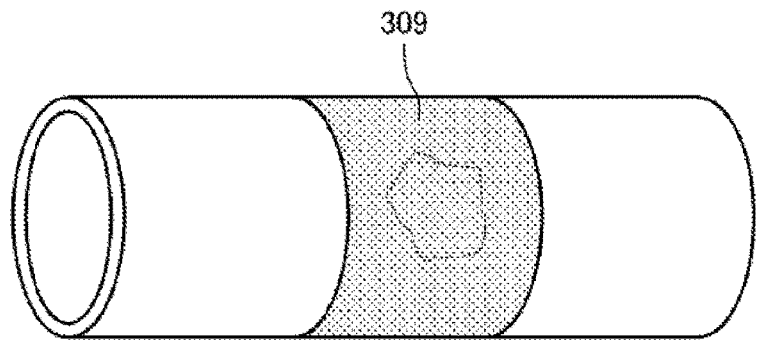
FIG. 22(A) is a perspective view of a state in which a repair material 309 is patched to a damaged part DP.
Figure 22B:
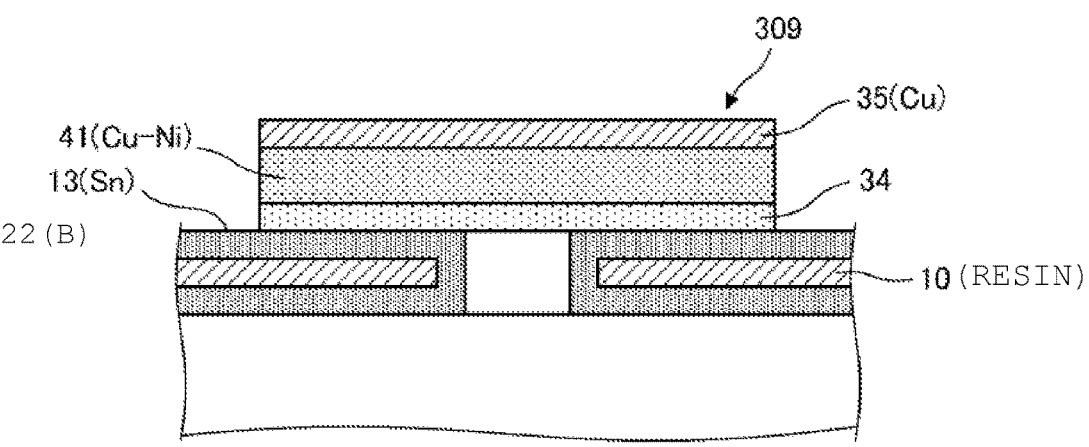
FIG. 22(B) is a sectional view of a repair portion of the damaged part DP.

FIG. 22(A) is a perspective view of a state in which a repair material 309 is patched to the damaged part DP, and FIG. 22(B) is a sectional view of a repair portion of the damaged part DP. As shown in FIG. 22(A), by using adhesion of the adhesive layer 34 of the repair material 309, the repair material 309 is bonded so as to block the damaged part DP. The repair material 309 is one in which the Cu—Ni thick film layer 41 and the adhesive layer 34 are formed on a Cu substrate sheet 35.

Figure 23A:
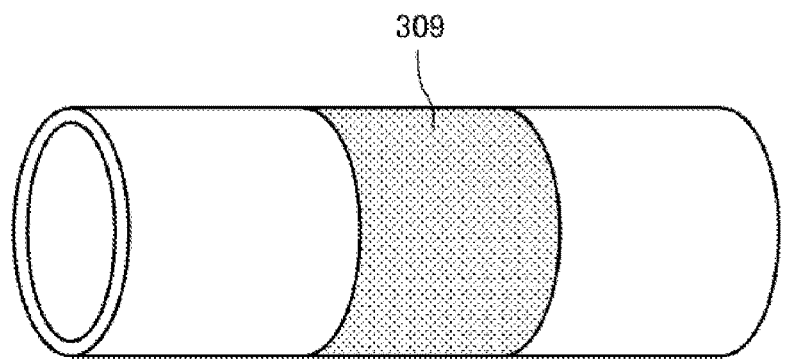
FIG. 23(A) is a perspective view of a state in which repair is completed by heating the repair material 309 and the vicinity thereof.
Figure 23B:
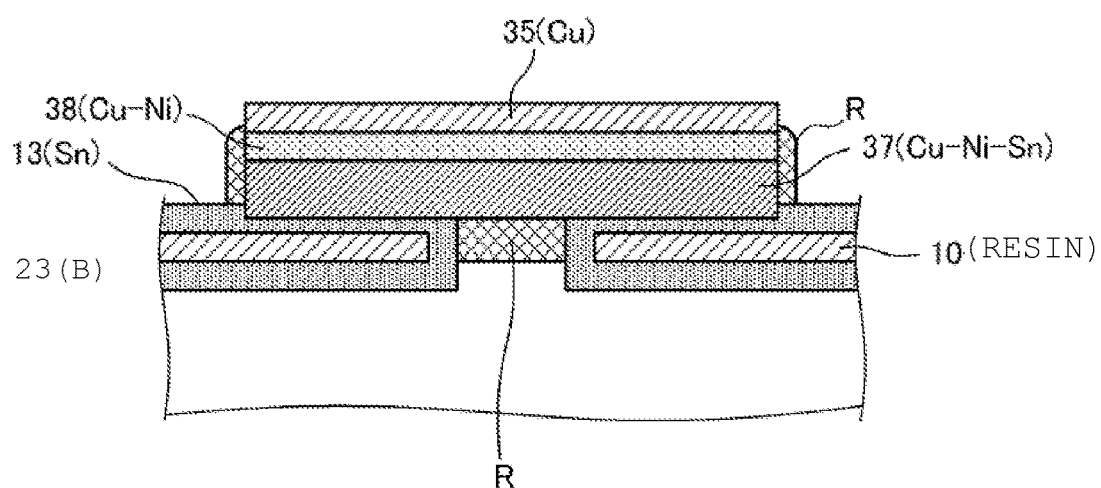
FIG. 23(B) is a sectional view of a repair portion of the damaged part DP.

Thereafter, the repair material 309 and the vicinity thereof are heated with hot air. FIG. 23(A) is a perspective view of a state in which repair is completed by heating the repair material 309 and the vicinity thereof, and FIG. 23(B) is a sectional view of a repair portion of the damaged part DP. A Cu—Ni alloy powder contained in the repair material 309 reacts with Sn in the Sn-plating film to produce a Cu—Ni—Sn alloy layer 37 which is a high melting point reactant. A principal intermetallic compound phase contained in the Cu—Ni—Sn alloy layer 37 is $(Cu, Ni)_6Sn_5$, and in addition to this, $Cu_2NiSn$ is contained. Further, a Cu—Ni layer 38 which is an intermetallic compound is formed at an interface between the substrate sheet 35 and the Cu—Ni—Sn alloy layer 37.

In the present embodiment, the Sn-plating film 13 corresponds to "a first metal," and Cu—Ni of a Cu—Ni thick film in the repair material 309 corresponds to "a second metal."

For formation of the plating film 13, a non-electrolytic plating method, an electrolytic plating (electroplating) method, a hot-dip plating method or the like can be used.

A resin film R which is an exudate of the resin component in the thick film layer 41 is formed on from the repair material 309 to the damaged part (circumferential edge of a hole) of the member to be repaired. An interface between the Cu—Ni—Sn alloy layer and the Sn-plating film is covered with the resin film R to enhance sealing properties of a tube.

In addition, the present embodiment can be similarly applied to materials other than a resin as a tube material as long as the material is one capable of Sn-plating. For example, the present embodiment can also be applied to ceramics. Further, the present embodiment can be similarly applied to metal members such as Cu pipe beyond the nonmetallic material. That is, joining may be performed through the TLP bonding of a high melting point metal on a side of the member to be repaired and a low melting point metal on a repair material side.

Tenth Embodiment

Figure 24A:
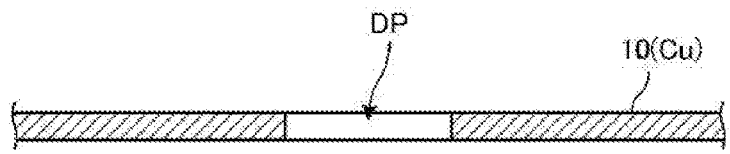
FIG. 24(A) is a sectional view of a member to be repaired 10 of Tenth Embodiment.
Figure 24B:
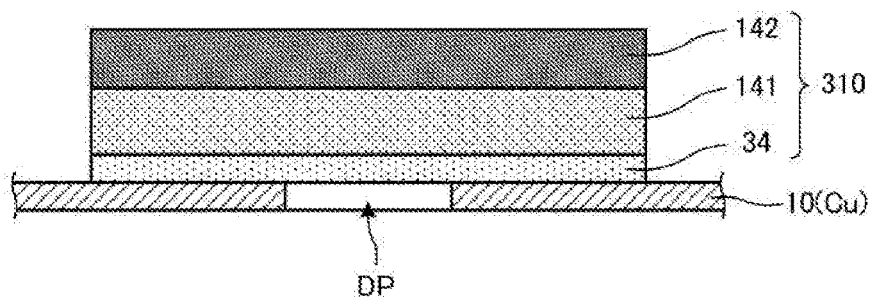
FIG. 24(B) is a sectional view of a state in which a repair material 310 is patched to a repair portion of the member to be repaired 10.
Figure 24C:
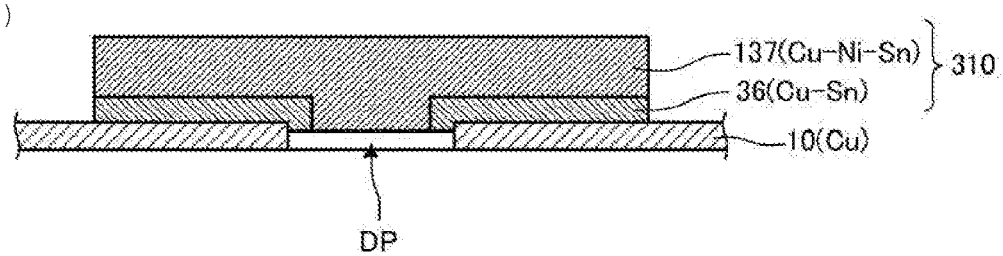
FIG. 24(C) is a sectional view of a state in which repair is completed.
Figure 25:
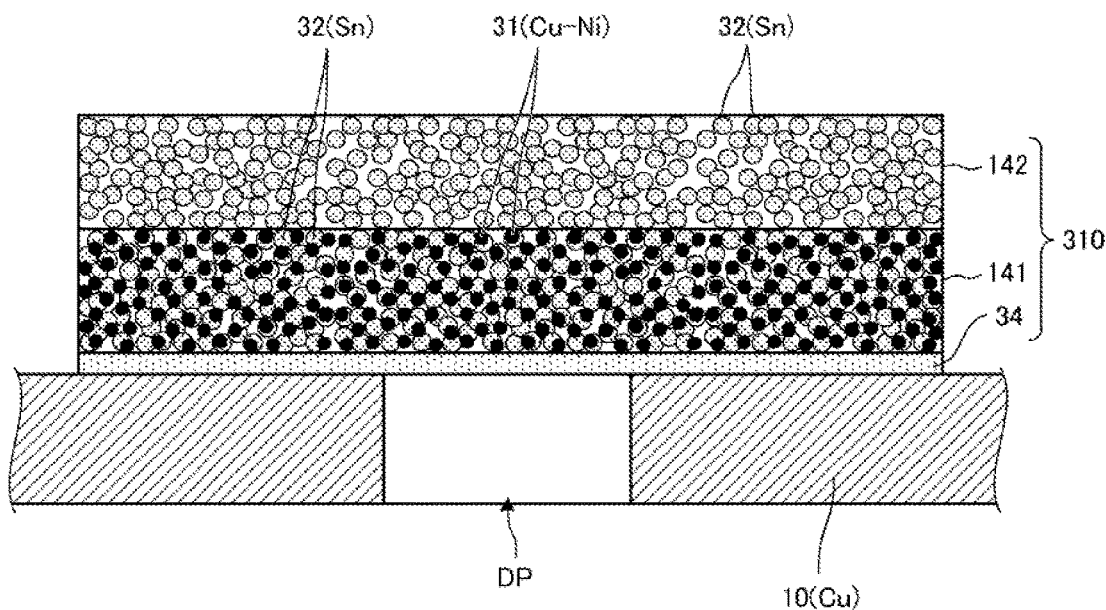
FIG. 25 is an enlarged sectional view of the repair material 310 shown in FIG. 24(B).
Figure 26:
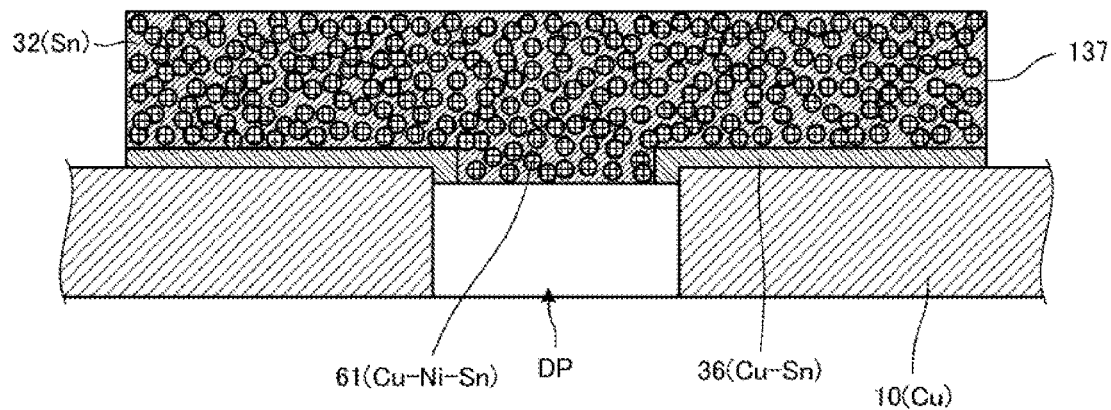
FIG. 26 is an enlarged sectional view of the repair material 310 shown in FIG. 24(C).

FIG. 24(A) is a sectional view of a member to be repaired of Tenth Embodiment, FIG. 24(B) is a sectional view of a state in which a repair material is patched to a repair portion of the member to be repaired 10, and FIG. 24(C) is a sectional view of a state in which repair is completed. FIG. 25 is an enlarged sectional view of the repair material 310 shown in FIG. 24(B). FIG. 26 is an enlarged sectional view of the repair material 310 shown in FIG. 24(C).

The repair material 310 shown in FIG. 25 is a repair sheet provided with a mixed layer of a raw-material component for forming a TLP layer, and a resin component that softens and flows during heat treatment. The repair material 310 is a repair sheet in which a Sn+Cu—Ni thick film joining material 141 and a Sn thick film joining material 142 are joined together to be combined into one.

In the repair material 310, the Sn+Cu—Ni thick film joining material 141 and the Sn thick film joining material 142 are combined into one by press-bonding or thermocompression bonding these materials after the lamination of these materials, or by coating any one of these two materials with the other material.

A Sn+Cu—Ni thick film joining material 141 has the same constitution as that of the Sn+Cu—Ni thick film joining material 40 described above, and is sheet-shaped. The Sn+Cu—Ni thick film joining material 141 contains a Cu—Ni alloy powder (high melting point metal powder) 31 having particle sizes of, for example, 0.5 to 30 μm, and a Sn powder (low melting point metal powder) 32 having particle sizes of 0.5 to 30 μm. A resin component of the Sn+Cu—Ni thick film joining material 141 is predominantly a binder and a flux.

Here, a mixing weight ratio between the Sn powder 32 and the Cu—Ni alloy powder 31 is preferably in the range of 80:20 to 30:70. When a ratio of the Sn powder 32 is more than 80 wt %, thick-film joining of Sn+Cu—Ni easily becomes a ball during heating.

On the other hand, when the ratio of the Sn powder 32 is less than 30 wt %, a joining force between the Sn+Cu—Ni thick film joining material 141 and the member to be repaired 10 is reduced. Further, one surface of the Sn+Cu-Ni thick film joining material 141 is covered with an adhesive layer 34.

The Sn thick film joining material 142 is sheet-shaped. The Sn thick film joining material 142 contains a Sn powder having particle sizes of 0.5 to 100 μm and a resin component that softens and flows during heat treatment. A resin component of the Sn thick film joining material 142 is predominantly a binder and a flux.

In addition, a ratio of the Sn powder 32 in all metal powders contained in the Sn+Cu—Ni thick film joining material 141 and the Sn thick film joining material 142 preferably does not exceed 90 wt %. The reason for this is that when the Sn powder 32 is present in an amount exceeding 90 wt % in all metal powders, a plurality of Sn powders 32 may be combined into one to become a ball before the Sn powder 32 reacts with the Cu—Ni alloy powder 31.

The member to be repaired 10 is, for example, a Cu plate, and has a damaged part DP, as shown in FIG. 24(A). In repairing the member to be repaired, as shown in FIG. 24(B), the damaged part DP is patched with the repair material 310 first.

Thereafter, the repair material 310 and the vicinity thereof are heated with hot air. Thereby, as shown in FIG. 24(C) and FIG. 26, a Cu—Ni alloy powder 31 contained in the Sn+Cu—Ni thick film joining material 141 reacts with a Sn powder 32 to produce a Cu—Ni—Sn alloy layer 137 which is a high melting point reactant, by TLP. The Cu—Ni—Sn alloy layer 137 is a porous body composed of an intermetallic compound such as $(Cu, Ni)_6Sn_5$ or $Cu_2NiSn$.

Further, by TLP, a Cu—Sn alloy layer 36 is formed at an interface between the member to be repaired 10 and the repair material 310. The Cu—Sn alloy is also an intermetallic compound as with the embodiment described above.

Moreover, the Sn powder 32 contained in the Sn thick film joining material 142 is melted and penetrates into a plurality of pores generated within the Cu—Ni—Sn alloy layer 137. Thereby, the plurality of pores within the Cu—Ni—Sn alloy layer 137 are filled with Sn, and therefore the Cu—Ni—Sn alloy layer 137 becomes more compact than the abovementioned Cu—Ni—Sn alloy layer 37.

In addition, it is preferred that the flux is contained in the adhesive layer 34. Thereby, there is the effect of making the surface of the member to be repaired 10 clean (removal of an oxide film) and a reaction rate is more improved.

In this manner, the TLP proceeds at relatively low temperatures, and a Cu—Ni—Sn alloy layer 137 having the melting point of, for example, 400° C. or higher is formed, and a compact Cu—Ni—Sn alloy layer 137 is formed.

In accordance with the present embodiment, a damaged part DP can be covered with a Cu—Ni—Sn alloy layer 137 having high heat resistance, and airtightness and liquid tightness can be ensured by just patching the repair material 310 and heating it at a relatively low temperature.

Eleventh Embodiment

Figure 27:
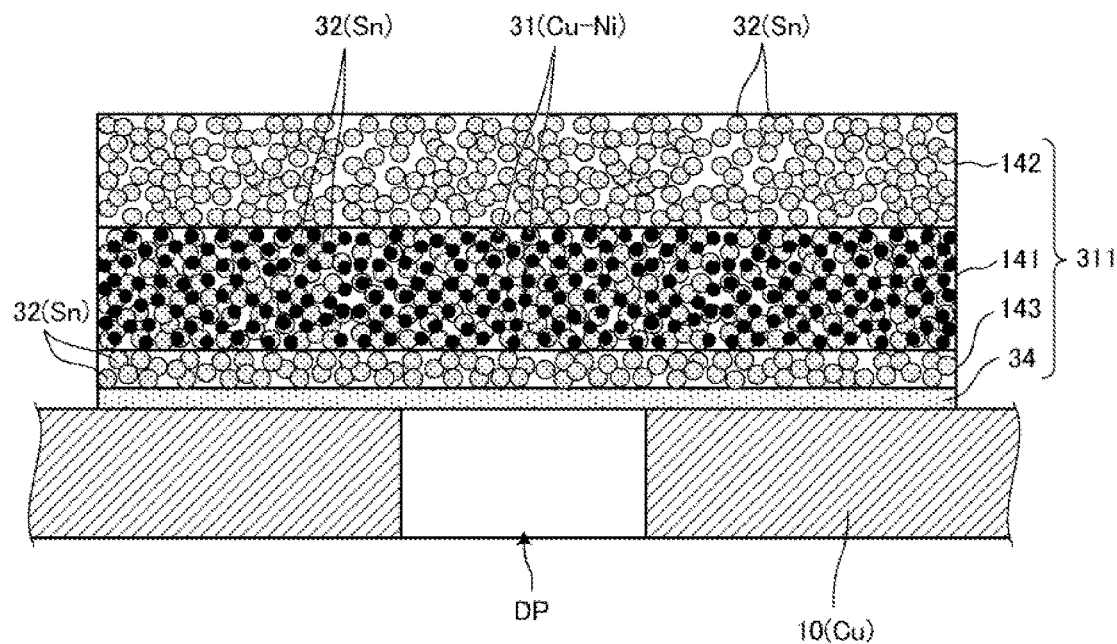
FIG. 27 is an enlarged sectional view of a repair material 311 of Eleventh Embodiment.

FIG. 27 is an enlarged sectional view of a repair material 311 of Eleventh Embodiment.

The repair material 311 shown in FIG. 27 is a repair sheet provided with a mixed layer of a raw-material component for forming a TLP layer, and a resin component that softens and flows during heat treatment. The repair material 311 is a repair sheet in which a Sn+Cu—Ni thick film joining material 141, a Sn thick film joining material 142 and a Sn thick film joining material 143 are joined together to be combined into one.

In the repair material 311, the Sn+Cu—Ni thick film joining material 141, the Sn thick film joining material 142 and the Sn thick film joining material 143 are combined into one by press-bonding or thermocompression bonding these materials after the lamination of these materials, or by coating any of these materials with another material.

A Sn+Cu—Ni thick film joining material 141 has the same constitution as that of the Sn+Cu—Ni thick film joining material 40 described above, and is sheet-shaped. The Sn+Cu—Ni thick film joining material 141 contains a Cu—Ni alloy powder (high melting point metal powder) 31 having particle sizes of, for example, 0.5 to 30 μm, and a Sn powder (low melting point metal powder) 32 having particle sizes of 0.5 to 30 μm. A resin component of the Sn+Cu—Ni thick film joining material 141 is predominantly a binder and a flux.

Here, a mixing weight ratio between the Sn powder 32 and the Cu—Ni alloy powder 31 is preferably in the range of 80:20 to 30:70. When a ratio of the Sn powder 32 is more than 80 wt %, thick-film joining of Sn+Cu—Ni easily becomes a ball during heating.

On the other hand, when the ratio of the Sn powder 32 is less than 30 wt %, a joining force between the Sn powder and the Cu—Ni alloy powder within the thick film joining material of Sn+Cu—Ni is significantly reduced, and flowage of a fluidified Sn powder cannot be suppressed.

Next, the Sn thick film joining material 142 is sheet-shaped. The Sn thick film joining material 142 contains a Sn powder having particle sizes of 0.5 to 100 μm and a resin component that softens and flows during heat treatment. A resin component of the Sn thick film joining material 142 is predominantly a binder and a flux.

Next, the Sn thick film joining material 143 is also sheet-shaped. A thickness of the Sn thick film joining material 143 is smaller than that of the Sn thick film joining material 142. Further, one surface of the Sn thick film joining material 143 is covered with an adhesive layer 34. With respect to other points, since the Sn thick film joining material 142 and the Sn thick film joining material 143 have the same constitution, a description of the Sn thick film joining material 143 will be omitted.

In addition, the Sn powder contained in the Sn thick film joining material 142 may be different in particle sizes from the Sn powder contained in the Sn thick film joining material 143, as required. For example, when the particle size of the Sn powder contained in the Sn thick film joining material 142 is larger than the particle size of the Sn powder contained in the Sn thick film joining material 143, a reaction of the Sn powder contained in the Sn thick film joining material 142 can be made slower than that of the Sn powder contained in the Sn thick film joining material 143.

Further, a ratio of the Sn powder 32 in all metal powders contained in the Sn+Cu—Ni thick film joining material 141, the Sn thick film joining material 142 and the Sn thick film joining material 143 preferably does not exceed 90 wt %. The reason for this is that when the Sn powder 32 is present in an amount exceeding 90 wt % in all metal powders, a plurality of Sn powders 32 may be combined into one to become a ball before the Sn powder 32 reacts with the Cu—Ni alloy powder 31.

The member to be repaired 10 is, for example, a Cu plate, and has a damaged part DP, as shown in FIG. 27. In repairing the member to be repaired, as shown in FIG. 27, the damaged part DP is patched with the repair material 311 first.

Thereafter, the repair material 311 and the vicinity thereof are heated with hot air. Thereby, a Cu—Ni alloy powder 31 contained in the Sn+Cu—Ni thick film joining material 141 reacts with a Sn powder 32 to produce a Cu—Ni—Sn alloy layer 137 which is a high melting point reactant, by TLP (refer to FIG. 24(C) and FIG. 26). The Cu—Ni—Sn alloy layer 137 is a porous body composed of an intermetallic compound such as $(Cu, Ni)_6Sn_5$ or $Cu_2NiSn$.

Further, by TLP, a Cu—Sn alloy layer 36 is formed at an interface between the member to be repaired 10 and the repair material 311. The Cu—Sn alloy is also an intermetallic compound as described above.

Moreover, the Sn powders 32 contained in the Sn thick film joining material 142 and the Sn thick film joining material 143 are melted and penetrate into a plurality of pores generated within the Cu—Ni—Sn alloy layer 137. Thereby, the plurality of pores within the Cu—Ni—Sn alloy layer 137 are filled with Sn, and therefore the Cu—Ni—Sn alloy layer 137 becomes more compact than the above-mentioned Cu—Ni—Sn alloy layer 37.

In addition, it is preferred that the flux is contained in the adhesive layer 34. Thereby, there is the effect of making the surface of the member to be repaired 10 clean (removal of an oxide film) and a reaction rate is more improved.

In this manner, the TLP proceeds at relatively low temperatures, and a Cu—Ni—Sn alloy layer 137 having the melting point of, for example, 400° C. or higher is formed, and a compact Cu—Ni—Sn alloy layer 137 is formed.

In accordance with the present embodiment, a damaged part DP can be covered with a Cu—Ni—Sn alloy layer 137 having high heat resistance, and airtightness and liquid tightness can be ensured by just patching the repair material 311 and heating it at a relatively low temperature.

Twelfth Embodiment

Figure 28:
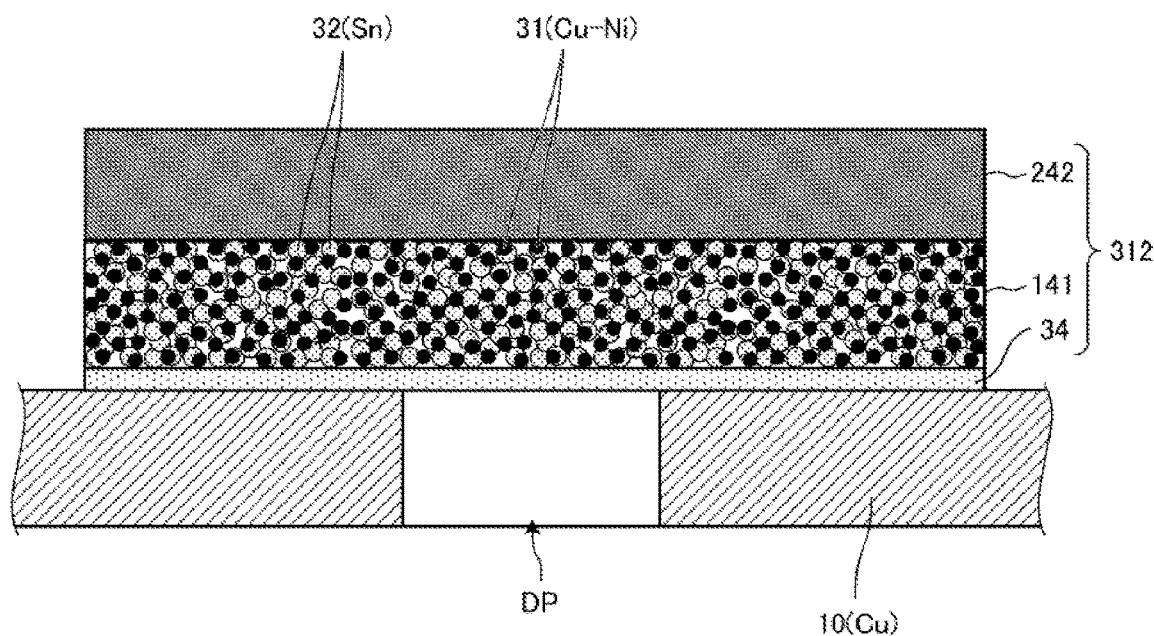
FIG. 28 is an enlarged sectional view of a repair material 312 of Twelfth Embodiment.

FIG. 28 is an enlarged sectional view of a repair material 312 of Twelfth Embodiment.

The repair material 312 of Twelfth Embodiment differs from the repair material 310 of Tenth Embodiment in that the Sn thick film joining material 142 made of the Sn powder 32 is replaced with a Sn foil 242. Since the repair material 312 is the same as the repair material 310 in other terms, a description of the repair material 312 will be omitted.

In this constitution, in repairing the member to be repaired, as shown in FIG. 28, the damaged part DP is patched with the repair material 312 first.

Thereafter, the repair material 310 and the vicinity thereof are heated with hot air. Thereby, a Cu—Ni alloy powder 31 contained in the Sn+Cu—Ni thick film joining material 141 reacts with a Sn powder 32 to produce a Cu—Ni—Sn alloy layer 137 which is a high melting point reactant, by TLP (refer to FIG. 24(C) and FIG. 26). The Cu—Ni—Sn alloy layer 137 is a porous body composed of an intermetallic compound such as $(Cu, Ni)_6Sn_d$ or $Cu_2NiSn$.

Moreover, the Sn foil 242 is melted and penetrates into a plurality of pores generated within the Cu—Ni—Sn alloy layer 137. Thereby, the plurality of pores within the Cu—Ni—Sn alloy layer 137 are filled with Sn, and therefore the Cu—Ni—Sn alloy layer 137 becomes more compact than the above-mentioned Cu—Ni—Sn alloy layer 37.

Accordingly, the repair material 312 of Twelfth Embodiment exerts the same operation and effect as the repair material 310 of Tenth Embodiment.

Thirteenth Embodiment

Figure 29:
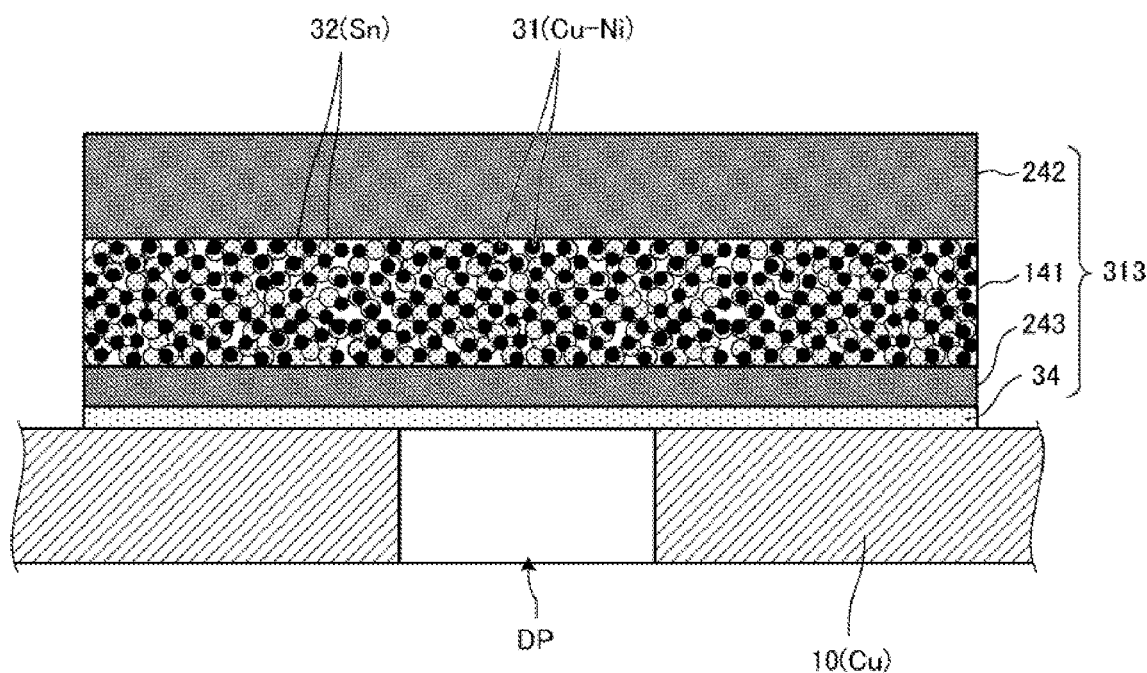
FIG. 29 is an enlarged sectional view of a repair material 313 of Thirteenth Embodiment.

FIG. 29 is an enlarged sectional view of a repair material 313 of Thirteenth Embodiment.

The repair material 313 of Thirteenth Embodiment differs from the repair material 311 of Eleventh Embodiment in that the Sn thick film joining material 142 and the Sn thick film joining material 143 respectively made of the Sn powder 32 are replaced with a Sn foil 242 and a Sn foil 243. Since the repair material 313 is the same as the repair material 311 in other terms, a description of the repair material 313 will be omitted.

In this constitution, in repairing the member to be repaired, as shown in FIG. 29, the damaged part DP is patched with the repair material 313 first.

Thereafter, the repair material 313 and the vicinity thereof are heated with hot air. Thereby, a Cu—Ni alloy powder 31 contained in the Sn+Cu—Ni thick film joining material 141 reacts with a Sn powder 32 to produce a Cu—Ni—Sn alloy layer 137 which is a high melting point reactant, by TLP (refer to FIG. 24(C) and FIG. 26). The Cu—Ni—Sn alloy layer 137 is a porous body composed of an intermetallic compound such as $(Cu, Ni)_6Sn_5$ or $Cu_2NiSn$.

Moreover, the Sn foil 242 and the Sn foil 243 are melted and penetrate into a plurality of pores generated within the Cu—Ni—Sn alloy layer 137. Thereby, the plurality of pores within the Cu—Ni—Sn alloy layer 137 are filled with Sn, and therefore the Cu—Ni—Sn alloy layer 137 becomes more compact than the above-mentioned Cu—Ni—Sn alloy layer 37.

Accordingly, the repair material 313 of Thirteenth Embodiment exerts the same operation and effect as the repair material 311 of Eleventh Embodiment.

Fourteenth Embodiment

Figure 30:
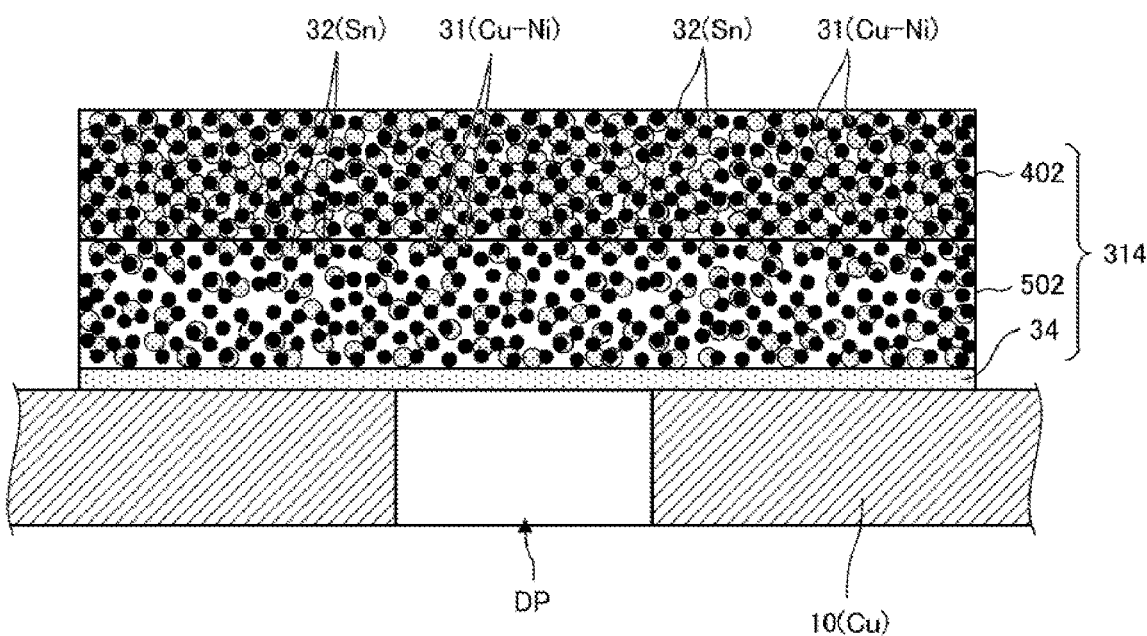
FIG. 30 is an enlarged sectional view of a repair material 314 of Fourteenth Embodiment.

FIG. 30 is an enlarged sectional view of a repair material 314 of Fourteenth Embodiment.

In the repair material 314, a Sn+Cu—Ni thick film joining material 502 and a Sn+Cu—Ni thick film joining material 402 are combined into one by press-bonding or thermocompression bonding these materials after the lamination of these materials, or by coating any one of these two materials with the other material.

The Sn+Cu—Ni thick film joining material 502 has the same constitution as that of the Sn+Cu—Ni thick film joining material 502 described above, and is sheet-shaped. The Sn+Cu—Ni thick film joining material 502 contains a Cu—Ni alloy powder (high melting point metal powder) 31 having particle sizes of, for example, 0.5 to 30 μm, and a Sn powder (low melting point metal powder) 32 having particle sizes of 0.5 to 30 μm. A resin component of the Sn+Cu—Ni thick film joining material 502 is predominantly a binder and a flux.

Here, a mixing weight ratio between the Sn powder 32 and the Cu—Ni alloy powder 31 is preferably in the range of 80:20 to 30:70. When a ratio of the Sn powder 32 is more than 80 wt %, thick-film joining of Sn+Cu—Ni easily becomes a ball during heating.

On the other hand, when the ratio of the Sn powder 32 is less than 30 wt %, a joining force between the Sn+Cu—Ni thick film joining material 502 and the member to be repaired 10 is reduced. Further, one surface of the Sn+Cu-Ni thick film joining material 502 is covered with an adhesive layer 34.

Next, the Sn+Cu—Ni thick film joining material 402 is also sheet-shaped. The amount of the Sn powder 32 in the Sn+Cu—Ni thick film joining material 402 is larger than the amount of the Sn powder 32 in the Sn+Cu—Ni thick film joining material 502. With respect to other points, since the Sn+Cu—Ni thick film joining material 502 and the Sn+Cu—Ni thick film joining material 402 have the same constitution, a description of the Sn+Cu—Ni thick film joining material 502 will be omitted.

In addition, a ratio of the Sn powder 32 in all metal powders contained in the Sn+Cu—Ni thick film joining material 402 and the Sn+Cu—Ni thick film joining material 502 preferably does not exceed 90 wt %. The reason for this is that when the Sn powder 32 is present in an amount exceeding 90 wt % in all metal powders, a plurality of Sn powders 32 may be combined into one to become a ball before the Sn powder 32 reacts with the Cu—Ni alloy powder 31.

In repairing the member to be repaired, as shown in FIG. 30, the damaged part DP is patched with the repair material 314 first.

Thereafter, the repair material 314 and the vicinity thereof are heated with hot air. Thereby, a Cu—Ni alloy powder 31 contained in the Sn+Cu—Ni thick film joining material 402 reacts with a Sn powder 32 to produce a Cu—Ni—Sn alloy layer 137 which is a high melting point reactant, by TLP (refer to FIG. 24(C) and FIG. 26).

Simultaneously, a Cu—Ni alloy powder 31 contained in the Sn+Cu—Ni thick film joining material 502 reacts with a Sn powder 32 to produce a Cu—Ni—Sn alloy layer 137 which is a high melting point reactant, by TLP (refer to FIG. 24(C) and FIG. 26). The Cu—Ni—Sn alloy layer 137 is a porous body composed of an intermetallic compound such as $(Cu, Ni)_6Sn_5$ or $Cu_2NiSn$.

Further, by TLP, a Cu—Sn alloy layer 36 is formed at an interface between the member to be repaired 10 and the repair material 314. The Cu—Sn alloy is also an intermetallic compound as described above.

Moreover, the residual Sn powders 32 contained in the Sn+Cu—Ni thick film joining material 402 and the Sn+Cu-Ni thick film joining material 502 are melted and penetrate into a plurality of pores generated within the Cu—Ni—Sn alloy layer 137 of the Sn+Cu—Ni thick film joining material 502.

Thereby, the plurality of pores within the Cu—Ni—Sn alloy layer 137 of the Sn+Cu—Ni thick film joining material 502 are filled with Sn, and therefore the Cu—Ni—Sn alloy layer 137 of the Sn+Cu—Ni thick film joining material 502 becomes more compact than the above-mentioned Cu—Ni—Sn alloy layer 37.

In addition, it is preferred that the flux is contained in the adhesive layer 34. Thereby, there is the effect of making the surface of the member to be repaired 10 clean (removal of an oxide film) and a reaction rate is more improved.

In this manner, the TLP proceeds at relatively low temperatures, and a Cu—Ni—Sn alloy layer 137 having the melting point of, for example, 400° C. or higher is formed, and a compact Cu—Ni—Sn alloy layer 137 is formed.

In accordance with the present embodiment, a damaged part DP can be covered with a Cu—Ni—Sn alloy layer 137 having high heat resistance, and airtightness and liquid tightness can be ensured by just patching the repair material 314 and heating it at a relatively low temperature.

Fifteenth Embodiment

Figure 31:
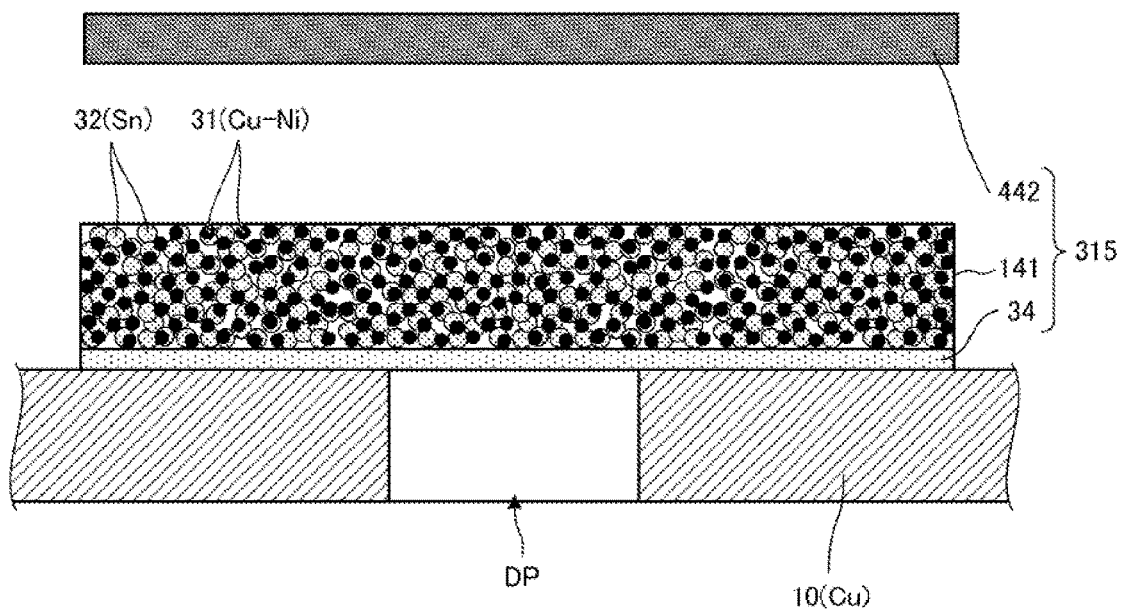
FIG. 31 is an enlarged sectional view of a repair material 315 of Fifteenth Embodiment.
Figure 32:
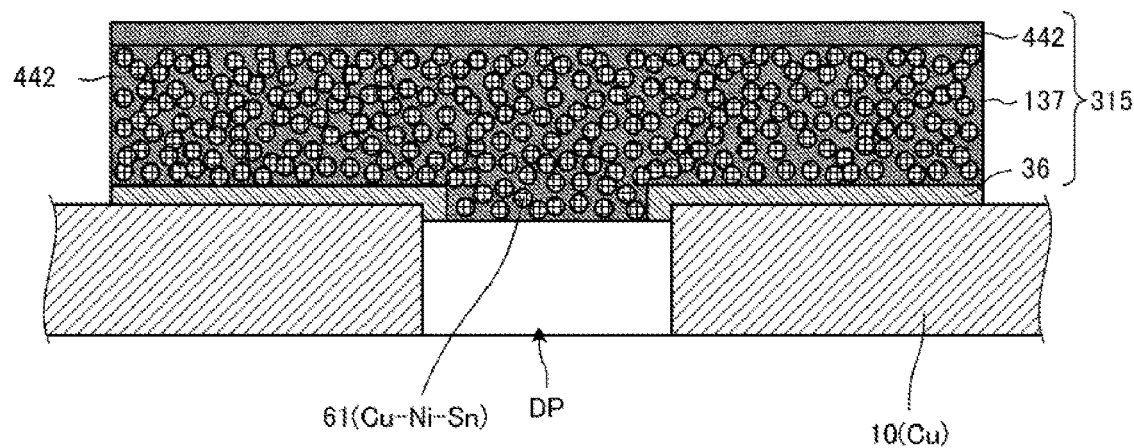
FIG. 32 is an enlarged sectional view of the repair material 315 with which repair is completed.

FIG. 31 is an enlarged sectional view of a repair material 315 of Fifteenth Embodiment. FIG. 32 is an enlarged sectional view of the repair material 315 with which repair is completed.

The repair material 315 shown in FIG. 31 is composed of a Sn+Cu—Ni thick film joining material 141 and a solder 442. The Sn+Cu—Ni thick film joining material 141 is a repair sheet provided with a mixed layer of a raw-material component for forming a TLP layer, and a resin component that softens and flows during heat treatment.

A Sn+Cu—Ni thick film joining material 141 has the same constitution as that of the Sn+Cu—Ni thick film joining material 40 described above, and is sheet-shaped. The Sn+Cu—Ni thick film joining material 141 contains a Cu—Ni alloy powder (high melting point metal powder) 31 having particle sizes of, for example, 0.5 to 30 μm, and a Sn powder (low melting point metal powder) 32 having particle sizes of 0.5 to 30 μm. A resin component of the Sn+Cu—Ni thick film joining material 141 is predominantly a binder and a flux.

Here, a mixing weight ratio between the Sn powder 32 and the Cu—Ni alloy powder 31 is preferably in the range of 80:20 to 30:70. When a ratio of the Sn powder 32 is more than 80 wt %, thick-film joining of Sn+Cu—Ni easily becomes a ball during heating.

On the other hand, when the ratio of the Sn powder 32 is less than 30 wt %, a joining force between the Sn+Cu—Ni thick film joining material 141 and the member to be repaired 10 is reduced. Further, one surface of the Sn+Cu-Ni thick film joining material 141 is covered with an adhesive layer 34.

The solder 442 is, for example, a SnCu base solder. The solder 442 corresponds to an auxiliary material of the present invention.

The member to be repaired 10 is, for example, a Cu plate, and has a damaged part DP, as shown in FIG. 31. In this constitution, in repairing the member to be repaired, as shown in FIG. 31, the damaged part DP is patched with the Sn+Cu—Ni thick film joining material 141 first.

Thereafter, the Sn+Cu—Ni thick film joining material 141 and the vicinity thereof are heated with hot air. Thereby, a Cu—Ni alloy powder 31 contained in the Sn+Cu—Ni thick film joining material 141 reacts with a Sn powder 32 to produce a Cu—Ni—Sn alloy layer 137 which is a high melting point reactant, by TLP. The Cu—Ni—Sn alloy layer 137 is a porous body composed of an intermetallic compound such as $(Cu, Ni)_6Sn_5$ or $Cu_2NiSn$.

Further, by TLP, a Cu—Sn alloy layer 36 is formed at an interface between the member to be repaired 10 and the Sn+Cu—Ni thick film joining material 141. The Cu—Sn alloy is also an intermetallic compound as described above.

In addition, it is preferred that the flux is contained in the adhesive layer 34. Thereby, there is the effect of making the surface of the member to be repaired 10 clean (removal of an oxide film) and a reaction rate is more improved.

Next, the solder 442 is melted and soldered to a principal surface of the Cu—Ni—Sn alloy layer 137 which is opposite to the member to be repaired 10. Thereby, the melted solder 442 penetrates into a plurality of pores generated within the Cu—Ni—Sn alloy layer 137, as shown in FIG. 32. Consequently, the plurality of pores generated within the Cu—Ni—Sn alloy layer 137 are filled with the solder 442, and therefore the Cu—Ni—Sn alloy layer 137 becomes more compact than the above-mentioned Cu—Ni—Sn alloy layer 37.

In this manner, the TLP proceeds at relatively low temperatures, and a Cu—Ni—Sn alloy layer 137 having the melting point of, for example, 400° C. or higher is formed, and a compact Cu—Ni—Sn alloy layer 137 is formed.

In accordance with the present embodiment, a damaged part DP can be covered with a Cu—Ni—Sn alloy layer 137 having high heat resistance, and airtightness and liquid tightness can be ensured by just patching the Sn+Cu—Ni thick film joining material 141 and heating it at a relatively low temperature.

In addition, thereafter, the solder 442 may be further soldered to a principal surface of the Cu—Ni—Sn alloy layer 137 which is opposite to the member to be repaired 10 using a common thread solder or solder bar to enhance the compactness of the Cu—Ni—Sn alloy layer 137, as required.

Other Embodiments

In addition, when the transient liquid phase diffusion (TLP) reaction is used, even Ni, Ag, Au or the like other than Cu can be applied as a high melting point metal. Heat treatment conditions (temperature and time) suitable for each metal have only to be set.

While in Sixth Embodiment, there has been described the example in which the resin component in the joining material is extruded outward and consequently a resin film R is formed on a lateral circumferential (exposed) portion of the alloy layer, this operation and effect can be similarly applied to Embodiments other than Sixth Embodiment. Further, it is possible to volatilize the resin component depending on a material and an amount of the resin component and heating condition, or it is possible that the resin film R is not formed as required.

As the low melting point metal powder, a powder having Sn as a main component can be used in addition to the above-mentioned Sn powder. Further, as the high melting point metal powder, a powder of one alloy or a plurality of alloys selected from the group consisting of a Cu—Ni alloy, a Cu—Mn alloy, a Cu—Al alloy, a Cu—Cr alloy, and an Ag—Pd alloy can be used in addition to the above-mentioned Cu—Ni alloy powder.

In addition, in the heating steps of the embodiments described above, far-infrared heating or high-frequency induction heating may be implemented besides hot air heating.

Further, in each of the embodiments described above, the member to be repaired 10 is a Cu plate, and the metal of the surface of the member to be repaired 10 is a metal having Cu as a main component, but the material is not limited to these.

In embodying the present invention, a metal of at least the surface of the member to be repaired may be a first metal predominantly composed of a low melting point metal, and the repair material may contain a second metal having a melting point higher than that of the low melting point metal.

For example, the metal of the surface of the member to be repaired may be a metal having Sn as a main component, and the repair material may contain at least one alloy selected from the group consisting of a Cu—Ni alloy, a Cu—Mn alloy, a Cu—Al alloy, a Cu—Cr alloy and an Ag—Pd alloy.

Also in this case, the damaged part of the member to be repaired is repaired with an alloy layer containing an intermetallic compound of a first metal and a second metal as a principal phase. Further, contrariwise, a metal of at least the surface of the member to be repaired may be a second metal predominantly composed of a high melting point metal, and the repair material may contain a first metal having a melting point lower than a melting point of the high melting point metal.

For example, the metal of the surface of the member to be repaired may be at least one alloy selected from the group consisting of a Cu—Ni alloy, a Cu—Mn alloy, a Cu—Al alloy, a Cu—Cr alloy and an Ag—Pd alloy, and the repair material may contain a metal having Sn as a main component.

Also in this case, the damaged part of the member to be repaired is repaired with an alloy layer containing an intermetallic compound of a first metal and a second metal as a principal phase.

In addition, the metal of the surface of the member to be repaired is not limited to a metal having Cu as a main component, and even a metal having Ag as a main component can be applied.

Further, in the embodiments described above, the substrate sheet 35 being a Cu foil, the substrate sheet 43 being a Cu—Ni foil, and Sn foils 242 and 243 are used, but the material is not limited to this. In embodying the present invention, for example, a Cu thin film, a Cu—Ni thin film, and a Sn thin film may be used.

An aspect of the damaged part described in each embodiment described above is an opened hole, but the present invention can be similarly applied to repair of a thin-walled part by wear and a cracked part.

In accordance with the embodiments described above, when the repair portion is filled with the repair material alone or the repair portion is sealed with the repair material, even though the repair material or a jig for holding the repair material are not additionally provided, the repair material does not flow or move during processing the repair material at high-temperatures since an alloying reaction proceeds quickly during processing at high-temperatures. Accordingly, the repair by joining metals together is completed as a structure in which the repair material is filled or patched before processing at high-temperatures, and therefore the repair can be simply implemented without a failure.

DESCRIPTION OF REFERENCE SYMBOLS

DP: Damaged part
R: Resin film
10: Member to be repaired
13: Sn plating film
31: Cu—Ni alloy powder
32: Sn powder
33: Resin component
34: Adhesive layer
35: Substrate sheet (Cu foil)
36: Cu—Sn compound layer
37: Cu—Ni—Sn alloy layer
38: Cu—Ni compound layer
40: Sn+Cu—Ni thick film joining material
41: Cu—Ni thick film joining material (thick film layer)
42: Sn thick film joining material (thick film layer)
43: Substrate sheet (Cu—Ni foil)
50: Joint layer
51: Sn layer
52: Cu—Ni layer
137: Cu—Ni—Sn alloy layer
141: Sn+Cu—Ni thick film joining material (thick film layer)

142: Sn thick film joining material (thick film layer)
242,243: Sn foil
301~315: Repair material
402: Cu—Ni thick film joining material (amount of Sn is large)
442: Solder
502: Cu—Ni thick film joining material (amount of Sn is small)

The invention claimed is:

1. A method for repairing a damaged part of a member to be repaired, the method comprising:
covering a damaged part of a metal surface with a repair material; and
heating the repair material to a predetermined temperature to form an alloy layer, wherein the alloy layer contains, as a principal phase, an intermetallic compound predominantly composed of a first metal and a second metal having a melting point higher than that of the first metal; and
disposing an auxiliary material containing the first metal on a surface of the repair material and heating the auxiliary material after heating the repair material to the predetermined temperature to form the alloy layer.

2. The repair method according to claim 1, wherein the first metal has Sn as a main component, and the second metal is at least one alloy selected from the group consisting of a Cu—Ni alloy, a Cu—Mn alloy, a Cu—Al alloy, a Cu—Cr alloy and an Ag—Pd alloy.

3. The repair method according to claim 1, wherein the metal surface is a metal having Sn as a main component, a metal having Ag as a main component, or a metal having Cu as a main component.

4. The repair method according to claim 1, wherein the repair material has a film layer containing the first metal as a metal powder and the second metal as an alloy powder.

5. A method for repairing a damaged part of a member to be repaired, the method comprising:
covering a damaged part of a metal surface with a repair material; and
heating the repair material to a predetermined temperature to form an alloy layer,
wherein the alloy layer contains, as a principal phase, an intermetallic compound predominantly composed of a first metal and a second metal having a melting point higher than that of the first metal,
wherein the repair material has a film layer containing the first metal as a metal powder and the second metal as an alloy powder, and
wherein an auxiliary layer which contains the first metal is disposed on the film layer, and a side of the film layer and the auxiliary layer is abutted against a side of the damaged part.

6. A method for repairing a damaged part of a member to be repaired, the method comprising:
covering a damaged part of a metal surface with a repair material; and
heating the repair material to a predetermined temperature to form an alloy layer,
wherein the alloy layer contains, as a principal phase, an intermetallic compound predominantly composed of a first metal and a second metal having a melting point higher than that of the first metal,
wherein the repair material has a film layer containing the first metal as a metal powder and the second metal as an alloy powder,
wherein an auxiliary layer containing the first metal and the second metal is disposed on the film layer, and a side of the thick film layer and the auxiliary layer is abutted against a side of the damaged part, and
wherein a content of the first metal in the auxiliary layer is larger than a content of the first metal in the film layer.

7. The repair method according to claim 4, wherein the film layer further contains a reducing agent and a resin.

8. The repair method according to claim 4, wherein the film layer is disposed on a substrate sheet.

9. The repair method according to claim 1, wherein the repair material has a multilayer structure of a first layer including the first metal and a second layer including the second metal.

10. The repair method according to claim 1, wherein the repair material has a multilayer structure of a foil or film made of the second metal and a film layer made of the first metal.

11. The repair method according to claim 1, wherein the repair material has a multilayer structure of a foil or film made of the first metal and a film layer made of the second metal.

12. The repair method according to claim 1, wherein the repair material has a multilayer structure of a foil or film made of the first metal and a foil or film made of the second metal.

* * * * *